United States Patent
Sakamoto et al.

(10) Patent No.: US 10,589,490 B2
(45) Date of Patent: Mar. 17, 2020

(54) LAMINATED POLYESTER FILM

(71) Applicant: Toray Industries, Inc., Tokyo (JP)

(72) Inventors: Mitsutaka Sakamoto, Otsu (JP); Mayumi Nakamura, Otsu (JP); Isao Manabe, Otsu (JP); Yasushi Takada, Otsu (JP); Satoshi Nakamura, Gifu (JP)

(73) Assignee: Toray Industries, Inc., Tokyo (JP)

( * ) Notice: Subject to any disclaimer, the term of this patent is extended or adjusted under 35 U.S.C. 154(b) by 217 days.

(21) Appl. No.: 15/552,925

(22) PCT Filed: Feb. 19, 2016

(86) PCT No.: PCT/JP2016/054862
§ 371 (c)(1),
(2) Date: Aug. 23, 2017

(87) PCT Pub. No.: WO2016/136615
PCT Pub. Date: Sep. 1, 2016

(65) Prior Publication Data
US 2018/0272679 A1   Sep. 27, 2018

(30) Foreign Application Priority Data

Feb. 27, 2015  (JP) ................................. 2015-038118
Feb. 27, 2015  (JP) ................................. 2015-038119
Feb. 27, 2015  (JP) ................................. 2015-038128

(51) Int. Cl.
| | | |
|---|---|---|
| B32B 27/36 | (2006.01) | |
| B29C 48/00 | (2019.01) | |
| B29C 48/21 | (2019.01) | |
| B32B 27/08 | (2006.01) | |
| B32B 27/20 | (2006.01) | |
| C08L 67/00 | (2006.01) | |
| C08K 5/10 | (2006.01) | |
| B32B 7/02 | (2019.01) | |
| B29C 55/00 | (2006.01) | |
| B29C 55/14 | (2006.01) | |
| B29C 71/02 | (2006.01) | |
| B32B 15/09 | (2006.01) | |
| B32B 37/15 | (2006.01) | |
| C08G 63/183 | (2006.01) | |
| B29K 67/00 | (2006.01) | |
| B29L 7/00 | (2006.01) | |
| B29L 9/00 | (2006.01) | |

(52) U.S. Cl.
CPC ............ *B32B 7/02* (2013.01); *B29C 48/0018* (2019.02); *B29C 48/022* (2019.02); *B29C 48/21* (2019.02); *B29C 55/005* (2013.01); *B29C 55/143* (2013.01); *B29C 71/02* (2013.01); *B32B 15/09* (2013.01); *B32B 27/08* (2013.01); *B32B 27/20* (2013.01); *B32B 27/36* (2013.01); *B32B 37/153* (2013.01); *C08G 63/183* (2013.01); *C08K 5/10* (2013.01); *C08L 67/00* (2013.01); *B29K 2067/00* (2013.01); *B29L 2007/008* (2013.01); *B29L 2009/00* (2013.01); *B32B 2250/03* (2013.01); *B32B 2250/244* (2013.01); *B32B 2250/40* (2013.01); *B32B 2307/40* (2013.01); *B32B 2307/4026* (2013.01); *B32B 2307/518* (2013.01); *B32B 2307/584* (2013.01); *B32B 2307/718* (2013.01); *B32B 2307/732* (2013.01)

(58) Field of Classification Search
CPC ......... B32B 27/00–27/36; B32B 15/09; Y10T 428/00–428/8305
See application file for complete search history.

(56) References Cited

U.S. PATENT DOCUMENTS

| | | | | |
|---|---|---|---|---|
| 7,371,276 | B2 * | 5/2008 | Takahashi ........... | C01G 23/0532 106/443 |
| 2004/0219316 | A1 * | 11/2004 | Takahashi ............... | B32B 15/08 428/35.7 |

FOREIGN PATENT DOCUMENTS

| | | |
|---|---|---|
| JP | 11-262987 A | 9/1999 |
| JP | 2000-177085 A | 6/2000 |
| JP | 2001-212918 A | 8/2001 |
| JP | 2001-220453 A | 8/2001 |
| JP | 2002-187963 A | 7/2002 |
| JP | 2002-302559 A | 10/2002 |
| JP | 2002-302560 A | 10/2002 |
| JP | 2006-130676 A | 5/2006 |
| JP | 2015-77783 A | 4/2015 |
| WO | 2007/094441 A1 | 8/2007 |

\* cited by examiner

*Primary Examiner* — Prashant J Khatri
(74) *Attorney, Agent, or Firm* — DLA Piper LLP (US)

(57) ABSTRACT

A laminated polyester film includes a pigment-containing polyester layer A and wax-containing polyester layers B1 and B2 on both sides of the polyester layer A, wherein the film satisfies formulae (I) and (II), and the coefficient of variation of water contact angle for each layer B1 and layer B2 is not less than 0% and not more than 10%, when the contact angle with water is measured 10 times at arbitrary defined positions within the range of 200 mm×200 mm:

$$Wb1 > Wa \quad (I)$$

$$Wb2 > Wa \quad (II)$$

wherein Wb1 and Wb2 represent the wax content per unit area of the layer B1 and layer B2 respectively, and Wa represents the wax content per unit area of the layer A, and wherein the coefficient of variation represents a value obtained by dividing the standard deviation in values measured 10 times by the average value.

8 Claims, No Drawings

LAMINATED POLYESTER FILM

TECHNICAL FIELD

This disclosure relates to a polyester film used suitably for applications that require coverage property such as laminated metal sheets and light-blocking tapes.

BACKGROUND

Thermoplastic resin films, especially biaxially-oriented polyester films are broadly used as a substrate film in various applications such as magnetic recording materials and packaging materials due to their excellent mechanical properties, electric properties, dimensional stability, transparency, chemical resistance and the like. For the metal can application, the production of white-colored laminated metal sheets by laminating a white film on a metal sheet to provide a clear print on the can surface (for example, JP 2000-177085 A, JP 2001-212918 A and JP H11-262987 A) has been discussed. Since coating is not necessary in that process, the white-colored laminated metal sheets have been proposed as an environment-friendly material which does not use an organic solvent. For the laminated metal sheet application, the improvement of releasability of the content by including wax has been discussed (for example, JP 2001-220453 A, JP 2006-130676 A and JP 2002-302559 A).

Although the films disclosed in JP 2000-177085 A, JP 2001-212918 A and JP H11-262987 A had base coverage property and did not cause a serious problem upon the production of cans in a shallow-drawn shape, when the cans were produced in a deep-drawn shape, they caused a problem in which damage was likely to occur due to the friction with the mold during can production when the surface touched the mold. The films disclosed in JP 2001-220453 A, JP 2006-130676 A and JP 2002-302559 A contained wax. However, it was a design primarily for better releasability of the content and not an appropriate design to provide scratch resistance during production of deep-drawn cans. For the light-blocking tape application, there was a processing drawback of foreign substances such as dust adherent to the film surface when an adhesive layer was coated on the film or when print processing was performed, resulting in a problem of the decrease in quality and yield of the light-blocking tape. On the other hand, coating a releasing layer alone on the film may have decreased the print property. Therefore, a film has been demanded which exhibits releasability before the processing and then acquires suitability for coating and print processing due to the heat caused by the processing such as coating and printing.

Thus, it could be helpful to provide a polyester film used suitably for applications in laminated metal sheets for deep-drawing molding, light-blocking tapes and the like. The second object is to provide a thin polyester film but having good base coverage property and good processing suitability at a high temperature, as well as to provide a white film with good molding processability, print property and coverage property as well as excellent processability at a high temperature and excellent detachability during a molding processing.

SUMMARY

We thus provide:
A first polyester film having a structure as explained below. In other words, the film has the following structure.

(1) A laminated polyester film comprising a pigment-containing polyester layer A and wax-containing polyester layers B1 and B2 on both sides of the polyester layer A, wherein the film satisfies formulae (I) and (II), the surface free energy of each layer B1 and layer B2 is not less than 27 mN/m and not more than 43 mN/mm, and the coefficient of variation of water contact angle for each layer B1 and layer B2 is not less than 0% and not more than 10%, when the contact angle with water is measured 10 times at arbitrary defined positions within the range of 200 mm×200 mm:

$$Wb1 > Wa \quad (I)$$

$$Wb2 > Wa \quad (II).$$

(wherein Wb1 and Wb2 represent the wax content per unit area ($\mu g/cm^2$) of the layer B1 and layer B2 respectively, and Wa represents the wax content per unit area ($\mu g/cm^2$) of the layer A.) The coefficient of variation used herein represents a value obtained by dividing the standard deviation in values measured 10 times by the average value.

(2) The laminated polyester film according to (1), which satisfies formula (III):

$$Wb1 > Wb2 \quad (III).$$

(3) The laminated polyester film according to (1) or (2), wherein the melting point of each of the polyester layer A, the polyester layer B1 and the polyester layer B2 is higher than 250° C. and equal to or lower than 280° C.

(4) The laminated polyester film according to any one of 1 to 3, wherein both the polyester layers B1 and B2 contain a pigment in an amount of not less than 0% by mass and not more than 5% by mass.

(5) The laminated polyester film according to any one of (1) to (4), having a color tone L value in the Hunter color system of 65 or more.

(6) The laminated polyester film according to any one of (1) to (5), having a thickness of not less than 10 μm and not more than 40 μm.

(7) The laminated polyester film according to any one of (1) to (6), wherein the film satisfies formulae (IV) to (VI), in which t (μm) represents the total thickness of the film, ta (μm) represents the thickness of the polyester layer A, tb1 (μm) represents the thickness of the polyester layer B1, and tb2 (μm) represents the thickness of the polyester layer B2:

$$tb1/tb2 > 1 \quad (IV)$$

$$0.05\ \mu m \leq |tb1 - tb2| \leq 2\ \mu m \quad (V)$$

$$0.08 \leq (tb1 + tb2)/t \leq 0.3 \quad (VI).$$

(8) The laminated polyester film according to any one of (1) to (7), wherein the film is used such that the polyester layer B2 is laminated on a metal sheet.

(9) A light-blocking tape, using the laminated polyester film according to any one of (1) to (7).

A second polyester film has a structure as explained below. In other words, it is a polyester film with the thickness of 10 to 40 μm and the L value in the Hunter color system of 80 or more, wherein one arbitrary in-plane direction of the film is the direction X and the other direction at a right angle to the direction X is the direction Y, and the thermal shrinkage ratio of the direction X (Sx) and the thermal shrinkage ratio of the direction Y (Sy) at 190° C. in 20 minutes satisfy formulae:

$$|Sx - Sy| \leq 4\% \quad (a)$$

$$Sx \leq 5\% \quad (b)$$

$$Sy \leq 5\% \quad (c).$$

A third polyester film has a structure as explained below. In other words, it is a laminated film in which a wax-containing polyester layer (layer A) is laminated on at least one side of a void-containing polyester layer (layer B), wherein the ratio of the cumulative thickness of each void (gap) of the layer B in the laminate thickness direction to the total thickness of film is 5 to 20%, and the L value in the Hunter color system of the laminated film is 80% or more.

The first polyester film exhibits good base coverage property and good scratch resistance during deep-drawing molding when the film is attached to a metal sheet to form a laminated metal sheet, and has a good yield and processing suitability when used as a light-blocking tape. The second polyester film achieves, when attached to a metal sheet or used as a light-blocking tape, an effect of providing the metal sheet or the tape with high coverage property and of allowing for the processing at a high temperature. The third polyester film achieves, when attached to a molding member, an effect of providing the molding member with high molding processability, print property, detachability and coverage property and of allowing for the processing at a high temperature.

DETAILED DESCRIPTION

The polyester film will be described in detail below.
First, Second and Third Polyester Films
Polyester The polyester of the first, second and third polyester films refers to a polymer in which a structure unit from dicarboxylic acid (dicarboxylic acid component) and a structure unit from a diol (diol component) are bound by an ester bond.

Examples of the dicarboxylic acid component include aromatic dicarboxylic acids, for example, terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyl ether dicarboxylic acid, and 4,4'-diphenyl sulfone dicarboxylic acid, aliphatic dicarboxylic acids such as adipic acid, suberic acid, sebacic acid, dimer acid, dodecanedioic acid and cyclohexanedicarboxylic acid, and ester derivatives with various aromatic dicarboxylic acids and aliphatic dicarboxylic acids. Apart from ethylene glycol, one diol component may be used alone, or two or more diol components may be used in combination.

Examples of the diol components can include ethylene glycol, 1,2-propanediol, 1,3-propanediol, neopentylglycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycols, 2,2-bis(4-hydroxyphenyl) propane, isosorbate and spiroglycol. Apart from ethylene glycol, one dicarboxylic acid component may be used alone, or two or more dicarboxylic acid components may be used in combination.

Among these dicarboxylic acid components and diol components, from the viewpoint of solvent resistance and heat resistance, terephthalic acid, isophthalic acid and 2,6-naphthalenedicarboxylic acid are preferred as the dicarboxylic acid component, and ethylene glycol, 1,4-butanediol, 1,4-cyclohexanedimethanol, isosorbate or spiroglycol is preferably used as the diol component. In addition to solvent resistance and heat resistance, from the viewpoint of the production cost, the combination of terephthalic acid and ethylene glycol is the most preferable.

When the polyester forming the first, second and third polyester films is composed of the combination of terephthalic acid and ethylene glycol, i.e., polyethylene terephthalate, the dicarboxylic acid component other than terephthalic acid is, based on 100 mol % of the total dicarboxylic acid component forming the polyester, preferably not less than 0 mol % and not more than 20 mol %, more preferably not less than 0 mol % and not more than 10 mol %, further preferably not less than 0 mol % and not more than 2 mol %, and particularly preferably 0 mol %, which means that the dicarboxylic acid component consists of a terephthalic acid component. When the dicarboxylic acid component other than the terephthalic acid component is more than 20 mol % based on 100 mol % of the total dicarboxylic acid component, the melting point and crystallizability of the polyester film may decrease, resulting in poor heat resistance and uneven thickness.

When the polyester forming the first, second and third polyester films is polyethylene terephthalate, the diol component other than ethylene glycol is, based on 100 mol % of the total diol component forming the polyester, preferably not less than 0 mol % and not more than 33 mol %, more preferably not less than 0 mol % and not more than 10 mol %, further preferably not less than 0 mol % and not more than 5 mol %, and particularly preferably 0 mol %, which means that the diol component only consists of ethylene glycol. When the diol component other than ethylene glycol is more than 33 mol % based on 100 mol % of the total diol component, the melting point and crystallizability of the polyester film may decrease, resulting in poor heat resistance and uneven thickness.
First Polyester Film
Layer A It is important that the first polyester film has a pigment-containing polyester layer A. The pigment-containing polyester layer A allows for good coverage property when the polyester film is applied to a laminated metal sheet and a light-blocking tape. Furthermore, it is also important that the polyester film has wax-containing polyester layers B1 and B2 on the both sides of the polyester layer A. When the polyester film is used for the laminated metal sheet application, the wax-containing polyester layers B1 and B2 on both sides of the polyester layer A, i.e., the outermost surfaces of the film, provide good scratch resistance during the can production on one side of the film (for example, the polyester layer B1) and less adhesion of foreign substances during the transportation for lamination on the other side of the film (for example, the polyester layer B2), thereby resulting in good quality of the laminated metal sheet. When used as a light-blocking tape, it is also possible to provide an inhibitory effect of adhesion of foreign substances such as dust with both sides.
First Polyester Film
Layer B1, Layer B2

It is important that the first polyester film has a surface free energy of not less than 27 mN/m and not more than 43 mN/m for each of layer B1 and layer B2. The layers B1 and B2 with a surface free energy of not less than 27 mN/m can allow for good print property of the layer B1 and good attachment property of the layer B2 with a metal sheet. The layers B1 and B2 with a surface free energy of not more than 43 mN/m can allow for good scratch resistance on the layer B1 during the can production and good quality of a laminated metal sheet on the layer B2. The surface free energy refers to a value obtained by a measurement method as in Examples. It is important that the first polyester film satisfies formulae (I) and (II).

$$Wb1>Wa \qquad (I)$$

$$Wb2>Wa \qquad (II)$$

Wb1 and Wb2 represent the wax content per unit area ($\mu g/cm^2$) of the layer B1 and layer B2 respectively, and Wa represents the wax content per unit area ($\mu g/cm^2$) of the layer A. The wax content per unit area of the layer refers to a value obtained by multiplying the mass concentration ($\mu g/cm^3$) of the wax contained in the layer by the thickness of the layer (cm). With the Wa smaller than the Wb1 and Wb2, the film contains wax and can achieve an effect of good scratch resistance during the can production and good quality of the laminated metal sheet while, upon the lamination processing, preventing the decrease in print property (for example, on the polyester layer B1 side) and attachment property of the film with a metal sheet (for example, on the polyester layer B2 side) due to the excessive bleeding-out of wax on the both sides of the film caused by heat during the can production. To achieve both scratch resistance and print property, the Wb1 is preferably not less than twice the Wa, more preferably not less than ten times the Wa. The Wb1 is preferably not less than 6 $\mu g/cm^2$, and more preferably not less than 9 $\mu g/cm^2$. From the viewpoint of the print property, the Wb1 is preferably not more than 20 $\mu g/cm^2$. To achieve both of the quality of the laminated metal sheet and the attachment property of the film with a metal sheet, the Wb2 is preferably not less than 1.5 times the Wa, and more preferably not less than five times the Wa. The Wb2 is preferably not less than 4 $\mu g/cm^2$, and more preferably not less than 6 $\mu g/cm^2$. From the viewpoint of the attachment property of the film with a metal sheet, the Wb2 is preferably not more than 10 $\mu g/cm^2$. The Wa of the first polyester film may be or may not be 0 $\mu g/cm^2$, but from the viewpoint of the attachment property between the polyester layer A and the polyester layer B1 and/or the polyester layer B2, the Wa of the first polyester film is preferably more than 0 $\mu g/cm^2$.

The wax in the first polyester film bleeds out on a film surface and thus has a role of decreasing friction between a laminated metal sheet and a mold during can production. Examples thereof include ester compounds of aliphatic carboxylic acid compounds and aliphatic alcohol compounds, and amide compounds of aliphatic carboxylic acid compounds and aliphatic amine compounds. Specifically, synthetic wax or natural wax such as stearyl stearate, carnauba wax, candelilla wax, rice bran wax, a full ester of pentaerythritol, behenyl behenate, paltyl myristate, or stearyl triglyceride is used.

It is important that the first polyester film has a coefficient of variation of water contact angle of not less than 0% and not more than 10% for each layer B1 and layer B2, when the contact angle with water is measured 10 times at arbitrary defined positions within the range of 200 mm×200 mm. In a laminated metal sheet, we discovered that merely increasing the concentration of wax contained in the film does not completely improve the scratch resistance during deep-drawing molding. After dedicated studies on a method of improving the scratch resistance during deep-drawing molding, we found that the uniform distribution of wax bleeding out on the film surface is important, and that the coefficient of variation of water contact angle at arbitrary positions within a range of 200 mm×200 mm is effective as an index to check the uniformity of the wax distribution. Furthermore, since a foreign substance such as dust tends to adhere selectively to a portion on the film surface where the wax amount is small, we also found that good uniformity of the wax distribution has an effect to improve the quality in the light-blocking tape application. For the polyester film, the coefficient of variation of water contact angle is, in terms of good scraping resistance during the deep-drawing molding and good quality of processed products, preferably not less than 0% and not more than 8%, and more preferably not less than 0% and not more than 6%. For the polyester film, examples of methods of having the coefficient of variation of water contact angle of not less than 0% and not more than 10% include, under the condition in which the surface temperature of a casting drum upon the production is set at 15° C. or lower to fix the wax contained in the film between the polyester molecule chains so that less wax bleeds out on the surface, a method in which the wax bleeds out at a time during a heat setting step at the heat setting temperature of 190° C. or higher for the heat setting duration of 5 seconds or more after the transverse stretching, and a method in which the film is further stretched transversely during the thermal fixation. The surface temperature of the casting drum is preferably 13° C. or lower, and 10° C. or lower is preferred. However, because too low a surface temperature of the casting drum may cause condensation on the drum surface, it is preferred that the humidity is maintained low. For methods of keeping the surface temperature of the casting drum at 15° C. or lower, for example, a method of lowering the temperature of the refrigerant circulating in the casting drum or increasing the flow rate per unit time, a method of blowing cold air onto the surface of the casting drum in an air chamber, or a method of combining these methods is used. The method of using an air chamber is also preferably used in terms of the direct cooling of the film on the casting drum with cold air.

In the first polyester film, a polyester layer B1 and a polyester layer B2 are identified as follows: determine the wax content per unit area of each surface layer in the three-layer structure, and refer to a layer with a larger wax content per unit area as the polyester layer B1, and a layer with a smaller wax content per unit area as the polyester layer B2. When the wax contents per unit area of the both surface layers are the same, the thickness of each surface layer is determined, and a thicker layer is referred to as the polyester layer B1, and a thinner layer is referred to as the polyester layer B2. When both of the wax contents per unit area and the thicknesses of both surface layers are the same, various evaluations are performed with an arbitrary surface as the polyester layer B1 and the opposite surface as the polyester layer B2.

When used in the laminated metal sheet application, the first polyester film preferably satisfies formula (III) to achieve both of scratch resistance during the can production on one side of the film (for example, the polyester layer B1) and attachment property with a metal sheet on the other side of the film (for example, the polyester layer B2):

$$Wb1 > Wb2 \qquad (III),$$

wherein Wb1 and Wb2 represent the wax content per unit area of the layer B1 and the layer B2, respectively. When the Wb1 is larger than Wb2, a good balance can be ensured between the property in which a large amount of wax bleeding out on the film surface is preferred such as scratch resistance during the can production, and the property in which its effect is observed when the amount of wax bleeding out on the film surface is small such as the adhesion of foreign substances like dust, and in which too large an amount of wax is not preferred from the viewpoint of the attachment property of the film with a metal sheet.

To achieve both of the scratch resistance during the can production and the attachment property with the metal sheet within a better range, in the first polyester film, the Wb1 is more preferably not less than 1.1 times the Wb2, and particularly preferably not less than 1.3 times. In addition, from the viewpoint of the quality as a laminated metal sheet, it is preferred that the Wb1 is not more than 100 times the Wb2.

In the first polyester film, examples of methods of making the Wb1>the Wb2 include a method of making the wax content concentration of the polyester layer B1 higher than that of the polyester layer B2 while keeping the same thickness for the polyester layers B1 and B2, a method of making the polyester layer B1 thicker than the polyester layer B2 while keeping the same wax content concentration for the polyester layers B1 and B2, and a method of changing both of the thicknesses and the wax content concentrations of the polyester layers B1 and B2. Considering the fact that an extruder can be shared during the production when the raw material compositions of the polyester layers B1 and B2 are the same, a method of making the polyester layer B1 thicker than the polyester layer B2 is preferred.

Third Polyester Film
Layer B

It is important that the third polyester film has a wax-containing polyester layer (layer A) laminated on at least one side of a void-containing polyester layer (layer B).

Formation of voids within a predetermined range on the layer B allows for both the suppression of film cracking during molding processing and coverage property of the film. Moreover, forming the wax-containing layer A on one side of the layer B can suppress the scraping of the film surface during molding processing. The absence of the layer A may result in poor sliding property with respect to the mold during molding processing, and thus molding property may worsen.

Third Polyester Film
Cumulative Thickness and Cumulative Length of Voids

In the third polyester film, it is important that the cumulative thickness of voids is 5 to 20% based on the total thickness of the film. When the laminate thickness of voids with respect to the film thickness is less than 5%, cushioning property during molding processing may be lost, resulting in a difficulty in the processing or poor base coverage property. On the other hand, when the cumulative thickness of voids with respect to the total thickness of the film is more than 20%, the handling during the processing may become difficult, or the film may crack during molding. In the polyester film, in terms of the handling property, base coverage property and molding property, the cumulative thickness of voids with respect to the total thickness of the film is preferably 6 to 19%, more preferably 7 to 17%, and particularly preferably 10 to 15%. The size of a single void in the thickness direction of the film is preferably 0.05 μm to 0.7 μm, and more preferably 0.1 to 0.5 μm. The size of a single void of 0.05 μm or less causes the L value in the Hunter color system to decrease, resulting in poor base coverage property while the size of more than 0.7 μm causes a problem of a crack in the film which starts from the void during the molding.

In the third polyester film, examples of methods of setting the ratio of the cumulative thickness of the individual voids to the total thickness of the film at 5 to 20% include a method of adjusting production conditions such as the stretching ratio, particle size of white pigments, thermal fixation treatment temperature and thermal fixation treatment temperature duration. From the viewpoint of the productivity, it is preferred that the void size is adjusted by carrying out a thermal treatment at 70 to 120° C., 170 to 210° C. and 210 to 240° C. sequentially for several seconds to a few tens of seconds for each after the biaxial stretching.

For the third polyester film, the cumulative length of the lengths of individual voids present in a 30-μm long film in the in-plane direction of a film cross section cut out vertically to the longitudinal direction is preferably 1 to 15% with respect to the film length of 30 μm. When the ratio of the cumulative length of the void lengths to the film length of 30 μm in the in-plane direction is less than 1%, the molding processing may become difficult, or base coverage property may become poor. Furthermore, when the ratio of the cumulative length of the void lengths to 30 μm in the in-plane direction is more than 15%, the handling during the processing may become difficult, or the film may crack during molding. In particular, 2 to 9% is more preferred, and 4 to 7% is further preferred.

The cumulative length of the lengths of individual voids present in the 30-μm long film in the in-plane direction of the third polyester film is set at 1 to 15% with respect to the film length of 30 μm by, for example, a method of adjusting production conditions such as the stretching temperature, stretching ratio, particle size of white pigments, thermal fixation treatment temperature and thermal fixation treatment temperature duration. From the viewpoint of the productivity, it is preferred that the void size is adjusted by carrying out a thermal treatment at 70 to 120° C., 170 to 210° C. and 210 to 240° C. sequentially for several seconds to a few tens of seconds for each after the biaxial stretching.

For the third polyester film, the area ratio of voids in the layer B is preferably 2 to 10% with respect to the cross-sectional area of the film. The ratio of less than 2% may cause the lack of base coverage property. The ratio of more than 10% may cause more difficult handling during processing. The content ratio of voids is set at 2 to 10% with respect to all the film layers by, for example, a method of adjusting production conditions such as the stretching temperature, stretching ratio, particle size of white pigments, thermal fixation treatment temperature and thermal fixation treatment temperature duration. From the viewpoint of the productivity, it is preferred that the void size is adjusted by carrying out a thermal treatment at 70 to 120° C., 170 to 210° C. and 210 to 240° C. sequentially for several seconds to a few tens of seconds after the biaxial stretching.

The void area ratio refers to a value obtained by the following method. The film is embedded in an epoxy resin, and a cross section perpendicular to the longitudinal direction of the film is cut out using a microtome. The cross section of the film is then imaged at a magnification of 4000 times using a scanning electron microscope S-2100A manufactured by Hitachi, Ltd. The film thickness and the thickness of each polyester layer were obtained from this image. Only the hollow portions were traced on a transparent film, and the area of the voids ($\mu m^2$) found in the film cross section with the thickness of 20 μm×the length of 30 μm was obtained using an image analyzer (LUZEX IID manufactured by Nireco Corporation). The area ratio of this area to the film area (600 $\mu m^2$) (void area/film area) is thus obtained as the void area ratio. Photos of cross sections of five sites arbitrarily selected from different measured fields of view from each other are used to calculate an average value.

First Polyester Film
Melting Point and Pigment Concentration of Each Layer

For the first polyester film, to suppress film deformation due to heat during lamination, printing and can production, and to prevent the loss of the flatness of the film even when the thermal fixation is carried out at a high temperature for the uniform concentration of wax on the film surface and the wax bleeds out at a time, the melting point of each of the polyester layer A, the polyester layer B1 and the polyester layer B2 is preferably higher than 250° C. and equal to or lower than 280° C. Each melting point of the individual layers within a range exceeding 250° C. allows for a heat setting at a high temperature such as 200° C. or higher, resulting in a uniform concentration of wax on the film surface, and good scratch resistance during the can production and good quality of processed items. When the melting point of each of the polyester layer A, the polyester layer B1 and the polyester layer B2 is 250° C. or lower, the film is heated to a temperature close to the melting point when the thermal fixation temperature is raised, which may cause a larger deformation of the film and the deterioration of the flatness as well as the low orientation of the film due to the onset of melting of the crystals of the constituent polyesters. Thus, the film may become brittle. When the melting point of each of the polyester layer A, the polyester layer B1 and the polyester layer B2 exceeds 280° C., the extrudability of the melts may deteriorate and thus the extrusion accuracy may become insufficient, resulting in a more uneven film thickness. Examples of methods of keeping the melting point of each of the polyester layer A, the polyester layer B1 and the polyester layer B2 at higher than 250° C. and equal to or lower than 280° C. include a method of using a polyester raw material with a melting point of higher than 250° C. and equal to or lower than 280° C. to produce the film.

In terms of good scratch resistance during the can production or the quality during print processing, the both the polyester layers B1 and B2 of the first polyester film preferably contain a pigment in an amount of not less than 0% by mass and not more than 5% by mass. The pigment in the first polyester film refers to powder to impart base coverage property, color and the like to the film. For a method of including the pigment in the film, a method is used, for example, of combining the pigment in a raw material chip when the film is produced. Among pigments, examples of white pigments include titanium oxide, barium sulfate, calcium carbonate, silica, and alumina, and in particular, titanium oxide is preferred in terms of the coverage property and the dispersion property in the polyester. Examples of black pigments include iron black and carbon black. Examples of yellow pigments include organic pigments such as condensed azo-based, quinophthalone-based, isoindolinone-based, isoindoline-based, anthraquinone-based, quinacridone-based and phthalocyanine-based pigments, calcined pigments, bismuth vanadate, and iron oxide-based pigments. The pigment concentrations of the polyester layer B1 and the polyester layer B2 are more preferably not less than 0% by mass and not more than 3% by mass, and a structure of not less than 0% by mass and not more than 1% by mass is particularly preferred. When the polyester layer B1 and/or the polyester layer B2 contain(s) the pigment of more than 5% by mass, a damage may be caused on a can during the can production, and a print defect may occur because of the difficulty of clear printing on pigment portions which are exposed on the film surface. From the curling suppression of the film, both the polyester layers B1 and B2 of the polyester film preferably contain a pigment in an amount of not less than 0% by mass and not more than 5% by mass, and a structure in which the pigment concentrations of the polyester layer B1 and the polyester layer B2 are the same is particularly preferred.

First, Second and Third Polyester Films
Color Tone L Value

From the viewpoint of base coverage property, the first and second polyester films preferably have a color tone L value of 65 or more in the Hunter color system. The L value of less than 65 in the Hunter color system may cause poor base coverage property. The L value of the polyester film is, from the viewpoint of better base coverage property, preferably 75 or more, more preferably 80 or more, and particularly preferably 84 or more. While a greater L value in the Hunter color system provides better base coverage property, the L value is preferably 100 or less from the viewpoint of good film-forming property.

The L value of the polyester film is 65 or more by, for example, a method of including a given amount of pigment in the polyester layer A. Among pigments, examples of white pigments include titanium oxide, barium sulfate, calcium carbonate, silica, and alumina. In particular, titanium oxide is preferred. When the pigment includes titanium oxide, it can be either anatase titanium oxide or rutile titanium oxide. In terms of the property of slits during the production, anatase titanium oxide is preferable among these white pigments. As an example, when anatase titanium oxide is used in the polyester film to have the L value of 80 or more, an aspect in which the amount of the anatase titanium oxide with respect to the total film amount is not less than 3% by mass and not more than 40% by mass is preferred, and an aspect in which the amount is not less than 5% by mass and not more than 35% by mass, further preferably not less than 7% by mass and not more than 30% by mass, and in particularly preferably not less than 15% by mass and not more than 25% by mass, is more preferred, although the amount varies according to the film thickness, A white pigment of less than 3% by mass with regard to the total film amount may result in an L value of less than 80. When a white pigment is included in an amount of more than 40% by mass with regard to the total film amount, the crystallization of polyesters forming the film may progress excessively from the white pigment as a starting point, and the film may fracture upon the transverse stretching. Thus, a biaxially-stretched polyester film may not be obtained.

First and Second Polyester Films
Thickness

The first and second polyester films preferably have a thickness of not less than 10 µm and not more than 40 µm. The thickness of less than 10 µm may result in more difficult handling upon the processing, poor base coverage property, or poor film-forming property. The thickness of more than 40 µm may cause a difficulty in the lamination with a metal sheet, or a thicker electronic component when the film is used as a double-sided adhesive light-blocking tape of the electronic component, and thus the film may be disadvantageous for the use in small products. In terms of handling property, lamination property, and the product thickness, the thickness of the polyester film is more preferably 6 to 30 µm, further preferably 8 to 25 µm, and particularly preferably 10 to 20 µm. Examples of methods of having the thickness of the first and second polyester films of 10 to 40 µm include a method of adjusting production conditions such as the discharge rate of polymers, casting drum rate, and stretching ratio.

To achieve both of scratch resistance upon the can production and the quality of the laminated metal sheet as well as the suppression of the decrease in print property (for example, the polyester layer B1 side) and attachment property of the film with the metal sheet (for example, the polyester layer B2 side), the first and second polyester films preferably satisfy formulae (IV) to (VI), wherein t (µm) represents the total thickness of the film, ta (µm) represents the thickness of the polyester layer A, tb1 (µm) represents the thickness of the polyester layer B1, tb2 (µm) represents the thickness of the polyester layer B2:

$$tb1/tb2 > 1 \quad \text{(IV)}$$

$$0.05 \ \mu m \leq |tb1 - tb2| \leq 2 \ \mu m \quad \text{(V)}$$

$$0.08 \leq (tb1 + tb2)/t \leq 0.3 \quad \text{(VI)}$$

When formulae (IV), (V) and (VI) are simultaneously satisfied, a good balance can be ensured between the property in which a large amount of wax bleeding out on the film surface is preferred such as scratch resistance during the can production, and the property in which its effect is observed when the amount of wax bleeding out on the film surface is small such as the adhesion of foreign substances like dust, and in which too large an amount of wax is not preferred from the viewpoint of the attachment property of the film with a metal sheet. Thus, a curling due to the difference in the thickness between the polyester layer B1 and the polyester layer B2 does not occur, thereby allowing for good base coverage property.

Second Polyester Film

Thermal Shrinkage Ratio

In the application for the lamination with a metal sheet, processing suitability at 190° C. is important so that the film does not undergo deformation due to heat applied during the lamination, printing and can production. Therefore, it is important that the second polyester film satisfies formulae (a) to (c), in which (Sx) and (Sy) represent the thermal shrinkage ratios at 190° C. in 20 minutes in the direction X and in the direction Y respectively, wherein the direction X is one arbitrary in-plane direction of the film and the direction Y is a direction which is at right angle to the direction X.

$$|Sx - Sy| \leq 4\% \quad \text{(a)}$$

$$Sx \leq 5\% \quad \text{(b)}$$

$$Sy \leq 5\% \quad \text{(c)}$$

When the |Sx−Sy| of the second polyester film is more than 4%, a wrinkle may occur when the film is laminated with metal or processed into an adhesive tape, or the misalignment may occur after the print processing.

The |Sx−Sy| of the second polyester film is preferably 3% or less, more preferably 1.5% or less and particularly preferably 0.6% or less.

Examples of the methods of having the |Sx−Sy| of the second polyester film of 4% or less include a method of setting the plane orientation coefficient at 0.8 to 1.4 and a method of setting the Δn at 0 to 30×10$^{-3}$, under the condition that each effective ratio of longitudinal stretching and transverse stretching has a similar value (for example, longitudinal stretching by 3 times, and transverse stretching by 3 times and the like) in both methods. The plane orientation coefficient refers to an index of the orientation of the in-plane direction of the film. The refractive index (nX) of one arbitrary in-plane direction X on the film, the refractive index (nY) of the direction Y which is at a right angle to the direction X, and the refractive index (nZ) of the thickness direction Z are measured to calculate the surface orientation coefficient from the formula "fn=(nX+nY)/2−nZ. The Δn refers to birefringence in the in-plane direction of the film and can be obtained by "Δn=nX−nY."

When the Sx and Sy of the second polyester film exceed 5%, respectively, the width shrinkage may increase when the film is laminated with metal or processed into an adhesive tape, and thus the yield of the laminated metal sheet or the double-sided adhesive light-blocking tape may decrease.

Each of Sx and Sy is preferably 4% or less, more preferably 3% or less, and particularly preferably 2% or less.

Examples of methods of setting each Sx and Sy of the second polyester film at 5% or less include a method of heat setting at 190° C. or higher after biaxial stretching at 190° C. or higher and a method of performing longitudinal stretching and/or transverse stretching again after biaxial stretching and increasing the plane orientation to suppress thermal shrinkage. The heat setting temperature after biaxial stretching is preferably not lower than 190° C. and not higher than 250° C., more preferably not lower than 200° C. and not higher than 240° C., and particularly preferably not lower than 210° C. and not higher than 230° C. When the longitudinal stretching and/or transverse stretching is/are carried out after the biaxial stretching, it is preferred that the first thermal fixation after the transverse stretching is not carried out or set at 100 to 120° C., and then the longitudinal stretching and or transverse stretching is carried out at a temperature range of 130 to 150° C.

For the second polyester film to have a heat setting temperature of 190° C. or higher after the biaxial stretching, the melting point of the polyester film is preferably not lower than 230° C. and not higher than 265° C. from the viewpoint of the quality and anti-brittleness of the film. The melting point of the polyester film is more preferably not lower than 246° C. and not higher than 260° C., and further preferably not lower than 250° C. and not higher than 260° C., and particularly preferably not lower than 253° C. and not higher than 257° C. When the melting point of the polyester film is lower than 230° C., the film is heated to a temperature close to the melting point when the thermal fixation temperature is set at 190° C. or higher, which may cause a larger deformation of the film and the deterioration of the flatness as well as the low orientation of the film due to the onset of melting of the crystals of the constituent polyesters. Thus, the film may become brittle. When the melting point of the polyester film exceeds 265° C., the extrudability of the melts may deteriorate and thus the extrusion accuracy may become insufficient, resulting in a more uneven film thickness.

It is not easy to obtain a film that achieves all the properties of thickness, L value in the Hunter color system and thermal shrinkage ratio at 190° C. in 20 minutes at the same time. For example, when the L value of Hunter color system is within a particular range or more in a film as thin as 40 μm or thinner, the film needs to contain a large amount of white pigment such as titanium oxide. However, as mentioned above, a large amount of white pigment causes the crystallization of polyesters forming the film to progress excessively and the film is likely to fracture upon the transverse stretching. On the other hand, the fracture during the transverse stretching can be suppressed by applying a copolyester such as isophthalic acid-copolymerized polyethylene terephthalate or 1,4-cyclohexanedimethanol-copolymerized polyethylene terephthalate, and decreasing the crystallizability, but the application of a copolyester also decreases the melting point of the polyester, and thus the thermal fixation temperature of the film cannot be raised sufficiently in terms of the flatness and anti-brittleness, resulting in a difficulty in decreasing the thermal shrinkage ratio at 190° C.

To obtain the second polyester film, it is important to apply a polyester having a small copolymerization amount, i.e., a high melting point and high crystallizability so that the thermal fixation temperature after the biaxial stretching is set at a high temperature of 190° C. or higher to suppress the thermal shrinkage ratio. Although the L value in the Hunter color system of 80 or more with a small thickness requires a large amount of white pigment contained in the film, this causes more likely a fracture during the stretching due to a higher crystallizability of polyesters. Thus, to achieve the second polyester film, a technique is important that suppresses the crystallization to prevent a fracture during stretching even when the film is thin while using a polyester with a very high crystallizability which has a high melting point and a large amount of the white pigment.

Examples of the technique to suppress the crystallization during stretching while using a polyester with a high crystallizability include the suppression of thermal crystallization during the casting and the suppression of the oriented crystallization by carrying out the longitudinal stretching gradually.

The suppression of thermal crystallization during the casting is specifically a method in which the surface temperature of the casting drum is set at 15° C. or lower and the temperature history for the crystallization of a polymer on the casting drum is avoided as much as possible. The surface temperature of the casting drum is preferably 13° C. or lower, and 10° C. or lower is preferred. However, because too low a surface temperature of the casting drum may form condensation on the drum surface, it is preferred that the humidity is maintained low. For methods of keeping the surface temperature of the casting drum at 15° C. or lower, for example, a method of lowering the temperature of the refrigerant circulating in the casting drum or increasing the flow rate per unit time, a method of blowing cold air onto the surface of the casting drum in an air chamber, or a method of combining these methods is used. The method of using an air chamber is also preferably used in terms of the direct cooling of the film on the casting drum with cold air.

The technique to suppress the crystallization by carrying out the longitudinal stretching gradually is specifically a method in which, when a sheet obtained in the casting step is stretched in the longitudinal stretching step, a low-ratio stretching is repeated over two steps or more, instead of stretching the film at a time to reach the desired ratio, to suppress the oriented crystallization during the stretching. For the low-ratio stretching, a ratio of each stretching is preferably 3 times or less, more preferably 2 times or less, further preferably 1.8 times or less, and particularly preferably 1.5 times or less. The stretching ratio of the total longitudinal stretching is preferably 2.5 times or more, more preferably 2.7 times or more, and particularly preferably 3 times or more.

Second Polyester Film
Surface Roughness, Glossiness

For the second polyester film, the surface roughness SRa of at least one side is preferably not less than 7 nm and not more than 30 nm, and the glossiness of at least one side at an incident angle of 60° is preferably not less than 80% and not more than 120%. When the surface roughness SRa of at least one side is not less than 7 nm and not more than 30 nm, the winding property of the film and the glossiness of the printed portion become better. The surface roughness SRa of at least one side is more preferably not less than 7 nm and not more than 20 nm, and further preferably not less than 7 nm and not more than 10 nm. In the polyester film, when the glossiness of at least one side at an incident angle of 60° is not less than 80% and not more than 120%, a good glossy appearance can be provided especially on unprinted portions. The glossiness at an incident angle of 60° is more preferably not less than 80% and not more than 110%, and particularly preferably not less than 85% and not more than 100%.

Examples of methods of setting the surface roughness SRa of at least one side and the glossiness at an incident angle of 60° within a given range, which is a preferable structure, include a method of providing the second polyester film with a structure of 2 or more layers, and making the content of the constituent white pigment of at least one side layer smaller than that of the remaining side layer(s).

Second Polyester Film
Mechanical Properties

When one arbitrary in-plane direction of the second polyester film is the direction X and the direction which is at right angle to the direction X is the direction Y, the strength at break in the direction X (Fx), the strength at break in the direction Y (Fy), the elongation at break in the direction X (Lx), and the elongation at break in the direction Y (Ly) of the second polyester film preferably satisfy the formulae below individually.

$$|Fx-Fy| \leq 30 \text{ MPa} \tag{e}$$

$$140 \text{ MPa} < Fx \leq 200 \text{ MPa} \tag{f}$$

$$140 \text{ MPa} < Fy \leq 200 \text{ MPa} \tag{g}$$

$$|Lx-Ly| \leq 30\% \tag{h}$$

$$80\% < Lx \leq 195\% \tag{i}$$

$$80\% < Ly \leq 195\% \tag{j}$$

When formula (e) is satisfied, the balance of the strains in the two directions becomes good, and thus the film is more unlikely to curl after the biaxial stretching. Furthermore, with formulae (f) and (g) satisfied, even when the film is applied under a high tension upon the introduction into a successive conveyance step for lamination with a metal sheet, printing on the film or the like, the film is more unlikely to fracture, resulting in good handling property. When the film is deformed with the metal sheet, it is possible to deform the film without any occurrence of a crack. When formula (h) is satisfied, the balance of the strains in the two directions becomes good, and thus the film is more unlikely to curl after the biaxial stretching. When formulae (i) and (j) are satisfied, it is possible to deform the film without any occurrence of a crack when the film is deformed with the metal sheet.

In the second polyester film, examples of methods of satisfying each of formulae (e) to (j) include a method of decreasing the copolymerization amount of the polyesters forming the polyester film and adjusting each of the longitudinal stretching ratio and transverse stretching ratio.

Second Polyester Film
Changes in Properties after Thermal Treatment

On at least one side of the second polyester film, the change in the glossiness at an incident angle of 60° between before and after a ten-minute thermal treatment at 120° C. is preferably not less than 0% and not more than 15% because this range maintains an even appearance even when uneven heating occurs during the application of heat in the molding and print drying. The change in the glossiness at an incident angle of 60° between before and after the ten-minute thermal treatment at 120° C. is more preferably not less than 0% and not more than 10%, and further preferably not less than 0% not more than 5%.

In the second polyester film, examples of the method of setting the change in the glossiness at an incident angle of 60° between before and after the ten-minute thermal treatment at 120° C. within a given range include a method of providing a polyester film having a structure of 2 or more layers, and making the content of the constituent white pigment of at least one side layer smaller than that of the remaining side layer(s). The film containing inorganic particles such as a white pigment forms an uneven shape on the surface due to the inorganic particles present close to the surface. When this film is heated to the glass-transition temperature or higher, the film deforms such that the surface area is reduced. This deformation causes the white pigment on the film surface to go deeper into the inside of the film, and the uneven shape on the film surface shrinks. We believe that the glossiness of the film thus changes after a thermal treatment. Therefore, on a layer of at least one side, a smaller content of the white pigment can reduce the amount of the white pigment which goes deeper into the inside of the film after the thermal treatment, resulting in a smaller change in the glossiness.

The polyester film has, in terms of a good glossy appearance after the can production, the glossiness of preferably 80% or more, and more preferably 83% or more after the ten-minute thermal treatment at 120° C. In addition, in terms of good sliding property during the can production, the glossiness after the ten-minute thermal treatment at 120° C. is preferably 120% or less. Examples of methods of having the glossiness of 80% or more after the ten-minute thermal treatment at 120° C. include a method of providing the polyester film with a structure of 2 or more layers, and making the content of the constituent white pigment of at least one side layer smaller than that of the remaining side layer(s).

On at least one side of the second polyester film, the change in the glossiness at an incident angle of 60° between before and after 50% stretching is preferably not less than 0% and not more than 20% because this range involves only a little change of surface appearance between before and after the film molding. The change in the glossiness at an incident angle of 60° between before and after the 50% stretching is more preferably not less than 0% and not more than 15%, more preferably not less than 0% and not more than 10%, and particularly preferably not less than 0% not more than 5%.

In the second polyester film, examples of methods of setting the change in the glossiness at an incident angle of 60° within a given range before and after the 50% stretching include a method of providing the polyester film with a structure of 2 or more layers, and making the content of the constituent white pigment of at least one side layer smaller than that of the remaining side layer(s), and a method of orienting in advance the long diameter of the white pigment in the in-plane direction by use of gradual stretching during longitudinal stretching so that the white pigment will be unlikely to change the orientation even when the stretching by 50% is performed afterwards.

In terms of a good glossy appearance after the can production, the polyester film has, after the 50% stretching, the glossiness at an incident angle of 60° of preferably 80% or more, and more preferably 83% or more. In addition, in terms of good sliding property during the can production, the glossiness at an incident angle of 60° after the 50% stretching is preferably 120% or less. Examples of methods of having the glossiness at an incident angle of 60° of 80% or more after the 50% stretching include a method of providing the polyester film with a structure of 2 or more layers, and making the content of the constituent white pigment of at least one side layer smaller than that of the remaining side layer(s).

To keep the surface roughness, glossiness, and the change in the glossiness before and after the thermal treatment and stretching of at least one side within a particularly good range, the second polyester film preferably has a structure in which the polyester layer A has a polyester layer B on at least one side thereof, and the polyester layer B does not contain a white pigment. The polyester layer B may contain known sliding particles other than a white pigment as long as the surface roughness, glossiness, and the change in the glossiness before and after the thermal treatment and stretching of at least one side are not impaired. In the polyester film, although the number of layers and the layer structure are not particularly limited to suppress the film curling and to achieve both the warpage reduction and the suppression of color interference upon the application of the film on a light polarizer, a structure is preferred in which the film is symmetrical in the thickness direction and the both surface layers thereof are polyester layers B, such as "layer B/layer A/layer B," or "layer B/layer A/layer B/layer A/layer B."

When a laminated structure is verified during an observation of the cross section, the observation photo of the cross section can be visually checked to determine the layer with more inorganic substances as the polyester layer A and the layer with less inorganic substances as the polyester layer B.

Third Polyester Film
Coefficient of Static Friction

For the third polyester film, the coefficient of static friction μs of the film is preferably 0.25 or less. When the coefficient of static friction is more than 0.25, sliding property between the film and the mold of a molding jig may worsen, and the appearance defect on the film may be caused after the molding. As a method of having the coefficient of static friction of 0.25 or less, it is preferred that inorganic-organic particles are contained in the film surface layer in addition to a wax component. To keep the coefficient of static friction μs at 0.25 or less only by use of inorganic-organic particles, the addition of a large amount of particles is required. However, the addition of a large amount of particles worsens the glossy appearance of the surface and therefore the print property (aesthetic property). The use of wax component alone results in poor degassing between films in a film-winding step, and the productivity decreases. The particles to be used may be known particles for the film addition. Preferable examples thereof include inside particles, inorganic particles, and organic particles. Examples of the inorganic particles include wet type and dry type silica, colloidal silica, aluminum silicate, titanium oxide, calcium carbonate, calcium phosphate, barium sulfate, aluminum oxide, micas, kaolin, and clays. Examples of organic particles include particles which contain styrene, silicone, an acrylic acid, a methacrylic acid, a polyester, a divinyl compound or the like as a constituent component. Among these, inorganic particles such as wet type and dry type silica and alumina and particles which contain as a constituent component styrene, silicone, acrylic acid, methacrylic acid, polyester, divinylbenzene or the like are preferably used. Two or more kinds of these inside particles, inorganic particles and organic particles can be used in combination. The amount of the particles to be added is not limited as long as the print property (aesthetic property) is not impaired. The wax component to be used may be any of the wax components disclosed above. The amount thereof to be added is not limited as long as the print property (aesthetic property) is not impaired.

Third Polyester Film
Surface Free Energy

In the third polyester film, the surface free energy of the film as measured by a wet reagent is preferably 30 to 35 mN/m. The surface free energy as measured by a wet reagent of less than 30 mN/m may cause print omission with inks during the print processing. On the other hand, the surface free energy of more than 35 mN/m may worsen the detachability from the mold during molding processing, resulting in the film adherent to the mold. The surface free energy is preferably 31 to 34 mN/m, and more preferably 32 to 33 mN/m.

For the third polyester film to have the surface free energy as measured by a wet reagent within such a range, the above wax is added preferably in an amount of 0.001 to 5 wt % based on the weight of the layer A, more preferably 0.1 to 3 wt %, and particularly preferably 0.5 to 2 wt %.

Third Polyester Film
Pigment

The number-average particle size of the white pigment used in the third polyester film is preferably 0.1 to 3 μm. When the number-average particle size is 0.1 μm or less, any void may not form, resulting in poor base coverage property. The number-average particle size of more than 3 μm may cause the formation of a large void, and a crack may occur on the film during the molding processing, starting from the large void. The number-average particle size is preferably 0.2 to 2 μm, more preferably 0.3 to 1.0 μm.

Third Polyester Film
Surface Roughness

In the third polyester film, the surface roughness SRa of at least one side is preferably 40 nm or less. The surface roughness SRa of more than 40 nm causes an insufficient glossy appearance of a printed portion and hence poor aesthetic property. The surface roughness SRa is preferably 35 nm or less, and more preferably 30 nm or less.

The third polyester film can be used preferably for lamination. When used for the lamination, the substrate therefor is not particularly limited, but the third polyester film can be preferably used with metal, paper, synthetic resins and the like. The third polyester film can be also used preferably in the application of carrying out molding processing after the lamination.

First, Second and Third Polyester Films
Applications

The first, second and third polyester films exhibit good base coverage property and good scratch resistance during deep-drawing molding when attached to a metal sheet to form a laminated metal sheet, and show a good yield and good processing suitability when used as a light-blocking tape. Thus, the first, second and third polyester films are preferably used in the application, for example, for producing metal cans, in which the films are laminated on a material of metal cans, i.e., a steel sheet, an aluminum sheet, or a metal sheet obtained by applying a variety of surface-treatments such as plating on the steel sheet or aluminum sheet, and the resulting metal sheet is molding processed by drawing or ironing.

Furthermore, an adhesive layer is further laminated or a print is performed so that the first, second and third polyester films are used preferably as a plastic member which will be a constituent member of an electronic component and or as a light-blocking tape which applied for use on the base of a glass member.

First, Second and Third Polyester Films
Additives

The first, second and third polyester films may contain a variety of additives, for example, an antioxidant, a heat-resistant stabilizer, a weathering stabilizer, an ultraviolet absorber, an organic glidant, a pigment, a dye, organic or inorganic particulates, a filler, an antistatic agent, a nucleating agent or the like in an amount that does not worsen the properties of the films.

First, Second and Third Polyester Films
Production Method Examples

Preferable methods of producing the first, second and third polyester films will be explained below, but it should not be interpreted that this disclosure is limited to these examples.

Polyester is supplied into a vent-type twin screw extruder, and melt and extruded. It is preferred that the screw extruder is under a passing nitrogen atmosphere with an oxygen concentration of 0.7% by volume or less and with the resin temperature controlled at 265° C. to 295° C. Each layer (in the case of the first polyester film, the polyester layer B1, the polyester layer A, the polyester layer B2) is supplied into a separate vent-type twin screw extruder, and melt and extruded, and then individual melt and extruded polymers are combined to form a laminated condition, using a device such as a feed block or a multi-manifold. When wax is contained in each layer, there is a method, for example, of including a wax-containing polyester chip in the total or a part of a polyester chip. Examples of methods of producing a wax-containing polyester chip include a method of adding wax during the polymerization of a polyester chip and a method of compounding a polyester chip and wax.

Then, foreign substances are removed through a filter and the extrusion amount is adjusted evenly by use of a gear pump, and the resulting laminate is discharged in a sheet shape on a cooling drum though a T-die. In doing this, the sheet-shaped polymers are attached closely to the casting drum by a static electricity application method in which electrodes with high voltage applied are used to attach closely the resin with the cooling drum by static electricity, a casting method in which a water membrane is provided between the casting drum and the extruded polymer sheet, a method in which the temperature of the casting drum is set at a glass-transition temperature or higher (glass-transition temperature −20° C.) of the polyester resin and thus the extruded polymers are adhered, or a combination of these methods. Then, the sheet-shaped polymers are cooled and cured to obtain an unstretched film. Among these casting methods, when polyester is used, the method of applying static electricity is preferably used from the viewpoint of productivity and flatness. The surface temperature of the casting drum is preferably 15° C. or lower, in terms of the suppression of the drum contamination due to the progress of the bleeding-out of wax for the first polyester film, and in terms of the balance between the coverage property as well as the processing suitability and stretching property at a high temperature for the second polyester film.

The first, second and third polyester films are preferably biaxially-oriented films in terms of processing suitability at a high temperature, the suppression of uneven thickness, and the like. A biaxially-oriented film can be obtained by a successive biaxial stretching method in which an unstretched film is stretched in the longitudinal direction and then in the transverse direction or stretched in the transverse direction and then in the longitudinal direction, or by a simultaneous biaxial stretching method in which the film is stretched almost simultaneously in the longitudinal direction and transverse direction.

For the stretching ratio in such a stretching method, the ratio of preferably not less than 2.8 times and not more than 3.5 times in the longitudinal direction, and further preferably not less than 3 times and not more than 3.3 times is employed. The stretching rate is desirably not less than 1,000%/min and not more than 200,000%/min. The temperature of the stretching in the longitudinal direction is preferably not lower than 95° C. and not higher than 130° C. The preheating at 85° C. for 1 second or more is preferred before the stretching. For the suppression of the thermal shrinkage ratio at 85° C., a method is also preferred in which the temperature of the first part of the stretching is not less than 100° C. and not more than 120° C., and the temperature of the middle part of the stretching is not less than 105° C. and not more than 130° C., and the temperature of the later part of the stretching is not less than 110° C. and not more than 150° C.

To achieve both coverage property and processing suitability at a high temperature, when high crystalline unstretched film containing a high concentration of pigment is stretched, a method is preferably employed in which the film is not stretched at a time to reach the desired ratio but stretched repeatedly over two low-ratio stretching steps or more to suppress the orientated crystallization during the stretching and hence suppress a fracture during the transverse stretching afterwards. For the low-ratio stretching, a ratio of each stretching is preferably 3 times or less, more preferably 2 times or less, further preferably 1.8 times or less, and particularly preferably 1.5 times or less. The stretching ratio of the total longitudinal stretching is preferably 2.5 times or more, more preferably 2.7 times or more, and particularly preferably 3 times or more.

The stretching ratio in the transverse direction is preferably matched with the stretching ratio in the longitudinal direction within a range of preferably not less than 2.8 times and not more than 3.5 times, and further preferably not less than 3 times and not more than 3.5 times. The stretching rate in the transverse direction is desirably not less than 1,000%/min and not more than 200,000%/min.

Afterwards, a second longitudinal stretching may be done if necessary. When the second longitudinal stretching is carried out, the stretching ratio is preferably not less than 1 time and not more than 2 times, and more preferably not less than 1.2 times and not more than 1.6 times. The stretching temperature is preferably not less than 140° C. and not more than 160° C.

Furthermore, after the biaxial stretching or the second longitudinal stretching, a thermal treatment is applied on the film. The thermal treatment may be carried out by any conventionally known method such as in an oven or on a heated roll. This thermal treatment is often carried out at a temperature not lower than 120° C. and not higher than the polyester melting point, and preferably 190° C. or higher, and more preferably 200° C. or higher. The thermal treatment duration is, for the even progress of the bleeding-out of wax on the surface, preferably 10 seconds or more, and more preferably 15 seconds or more. From the viewpoint of lamination property with a metal sheet, the thermal treatment duration is preferably 60 seconds or less, and more preferably 30 seconds or less.

To promote a bonding ability with a print layer, bonding layer, or the like, at least one side may be corona-treated or coated with an easy adhesion layer. As a method of providing a coating layer in the film production step, a method is preferred in which a coating layer composition is dispersed in water and the resulting dispersant is evenly applied on an at least monoaxially-stretched film by use of a metaling bar or a gravure roll, and then the coating agent is dried while the film is stretched. In this case, the thickness of the easy adhesion layer is preferably not less than 0.01 μm and not more than 1 μm. A variety of additives such as antioxidants, heat-resistant stabilizers, weathering stabilizers, ultraviolet absorbers, infrared absorber, pigments, dyes, organic or inorganic particles, antistatic agents, and nucleating agents may be added to the easy adhesion layer. A resin preferably used in the easy adhesion layer is preferably at least one resin selected from an acrylic resin, a polyester resin and a urethane resin in terms of adhesion property and handling property. Re-annealing under the condition of 140 to 200° C. is also preferably employed.

After laminated on a metal sheet or the like, the first, second and third polyester films can be used preferably as metal cans which are produced by drawing molding or ironing molding. By performing a print in black, they can also be used preferably as a light-blocking tape which is placed on a window frame of an electronic device such as a smartphone or a tablet.

EXAMPLES

The methods of measuring the properties of our films and evaluating the effects are as follows.

(1) Composition of Polyesters

A polyester resin and film were dissolved in hexafluoroisopropanol (HFIP), and the contents of each monomer residue component and the byproduct diethylene glycol were quantified using $^1$H-NMR and $^{13}$C-NMR. In the case of a laminated film, each film layer was scraped off according to the laminate thickness, and the components forming each single layer was collected and measured. The composition of the film was calculated from the mixture ratio during the film production.

(2) Surface Free Energy

By use of a contact angle meter (manufactured by Kyowa Interface Science Co., Ltd., CA-D type), a laminated film after 24 hours of humidity adjustment under the conditions of 23° C. and 65% RH was measured for the static contact angle with respect to the film surface, using four liquids for measurement of water, ethylene glycol, formamide, and methylene iodide, and a contact angle meter CA-D type manufactured by Kyowa Interface Science Co., Ltd. For each liquid, each component of the obtained contact angle and surface tension of the liquid for measurement was substituted into the following formulae to solve the system of equations consisting of four formulae to determine $\gamma^L$, $\gamma^+$, and $\gamma^-$.

$$(\gamma^L \gamma_j^L)^{1/2} + 2(\gamma^+ \gamma_j^-)^{1/2} + 2(\gamma_j^+ \gamma^-)^{1/2} = (1+\cos\theta)[\gamma_j^L + 2(\gamma_j^- + \gamma_j^-)^{1/2}]/2,$$

provided that $\gamma = \gamma^L + 2(\gamma^+ \gamma_-)^{1/2} \gamma_j = \gamma_j^L + 2(\gamma_j^+ \gamma_j^-)^{1/2}$, wherein $\gamma$, $\gamma^L$, $\gamma^+$, and $\gamma^-$ represent surface free energy, a long distance force member, a Lewis acid parameter, and a Lewis base parameter of the film surface, respectively, while $\gamma_j$, $\gamma_j^L$, $\gamma_j^+$, and $\gamma_j^-$ represent surface free energy, a long distance force member, a Lewis acid parameter, and a Lewis base parameter of the used liquids for measurement, respectively.

For the surface tension of each liquid used herein, values in Table 1 proposed by Oss ("Fundamentals of Adhesion", L. H. Lee (Ed.), p 153, Plenum ess, New York (1991)) were used.

TABLE 1

|  | $\gamma$ | $\gamma^L$ | $2(\gamma^+\gamma^-)^{1/2}$ | $\gamma^+$ | $\gamma^-$ |
|---|---|---|---|---|---|
| Water | 72.8 | 21.8 | 51 | 25.5 | 25.5 |
| Ethylene Glycol | 48 | 29 | 19 | 1.92 | 47 |
| Formamide | 58 | 39 | 19 | 2.28 | 39.6 |
| Methylene Iodide | 50.8 | 50.8 | ~0 | — | — |

In Reference Comparison Example 51 to 62 and Reference Comparison Example 1 to 7, a wet reagent manufactured by Wako Pure Chemical Industries, Ltd. was used according to JIS K6768 to measure the wetting tension of the film surface. A cotton swab was dipped in the wet reagent, and the wet reagent was applied for about 1 second in the shape of 5 mm×100 mm. In the application shape 2 seconds later the application, a wetting index from right after the application to the status with no change in the shape was considered as surface free energy by wetting tension.

(3) Film Thickness, Layer Thickness

The film was embedded in an epoxy resin and a cross section of the film was cut out with a microtome. The cross section was observed using a transmission electron microscope (manufactured by Hitachi, Ltd., TEM H7100) with a magnification of 5000× to determine the film thickness and the thickness of each polyester layer.

(4) Melting Point of Each Layer

After each film layer was scraped off, it was measured and analyzed using a differential scanning calorimetry (manufactured by Seiko Instruments & Electronics Ltd., RDC220) according to JIS K7121-1987, JIS K7122-1987. Five mg of a specimen for measurement was cut out and used as a sample, which was heated from 25° C. to 300° C. in increments of 20° C./min. The temperature of the heat absorption peak obtained from the resulting DSC curve was used as a melting point of the film. When 2 or more melting points were observed, the biggest heat absorption peak was used as a melting point of each layer.

(5) L Value in Hunter Color System

A color meter (manufactured by Suga Test Instruments Co., Ltd., SM-T) was used to measure values measured on a transmission mode of the Hunter method, according to JIS P812213-1961. The incident surface of light was measured 5 times for each side, which means 10 times in total for both sides. The measured values of the total ten measurements were averaged and the average value was considered as the color tone L value of the film.

(6) Scratch Resistance

Using a rubber roll, a film to be evaluated was laminated on one side of a tin free steel sheet (steel sheet) heated at 250° C., and a polyester film "Lumirror S10" manufactured by Toray Industries, Inc. (melting point: 255° C., thickness: 23 µm) was laminated on the other side simultaneously. The resulting laminated metal sheet was molded using an ironing apparatus and a drawing apparatus to produce a cylindrical can with a diameter of 6 cm and a height of 13 cm, having the side of the film to be evaluated on the outer side of the can. The appearance of the drum section of the produced can was evaluated visually according to the following criteria.
A: No scratch is observed.
B: When the can was held against light, a strip-shaped scratch is slightly observed, but no scratch that reveals a visible underlying surface of the steel sheet is observed.
C: One scratch that reveals a visible underlying surface of the steel sheet is observed.
D: Two or more scratches that reveal a visible underlying surface of the steel sheet are observed.

(7) Quality After Processing

An A4-sized laminated metal sheet obtained in the same way as in (6) was evaluated visually for the appearance of the side of the film to be evaluated, according to the following criteria.
A: No air bubble defect is observed.
B: Although 1 to 5 air bubble defect(s) with a long diameter of less than 3 mm is/are observed, no defect with a long diameter of 3 mm or more is observed.
C: Although 6 or more air bubble defects with a long diameter of less than 3 mm are observed, no air bubble defect with a long diameter of 3 mm or more is observed.
D: One or more air bubble defects with a long diameter of 3 mm or more are observed.

(8) Dimensional Stability

An A4-sized film was placed between two A4-sized metal frames (a shape in which a central portion was cut out with a gap of 20 mm left on each of the four sides) and fixed with a metal clip. On the central portion of the A4-sized film, a mark the size of 50 mm×50 mm (the direction of the longer side of the A4 size (referred to as longer side direction herein after)×the direction of the shorter side of the A4 size (referred to as shorter side direction hereinafter)) was drawn such that the central portion of the mark would overlap the central portion of the film. The film was then introduced into a 5-meter hot air drying oven set at 160° C. at a transportation rate of 2.5 m/min. The film exiting the hot air drying oven was measured for the cell size and film state, and evaluated according to the following criteria.
A: The rate of change in the cell size of the film was less than 1% in both the longer side direction and the shorter side direction, and no wrinkle was observed on the film.
B: The rate of change in the cell size of the film was less than 1% either in the longer side direction or in the shorter side direction and 1% or more in the other direction, and no wrinkle was observed on the film.
C: The rate of change in the cell size of the film was 1% or more in both the longer side direction and the shorter side direction, and no wrinkle was observed on the film.
D: A wrinkle was observed on the film.

(9) Print Property

On a film cut out into the A4 size, a thermosetting ink, in which an ink, solvent and a curing agent were mixed in the following ratios, was applied using a bar coater such that the film thickness would be about 5 µm.
Ink: INQ Screen Ink (971) manufactured by Teikoku Printing Inks Mfg. Co., Ltd.: 100 parts by weight
Solvent: F-003 manufactured by Teikoku Printing Inks Mfg. Co., Ltd.: 10 parts by weight
Curing agent: 240 curing agent manufactured by Teikoku Printing Inks Mfg. Co., Ltd.: 3 parts by weight The film with the thermosetting ink applied on was then dried in a hot air oven at 90° C. for 60 minutes to cure the thermosetting ink, and an ink-laminated film was thus obtained.

On the ink-laminated surface of the resulting ink-laminated film, 100 cross cuts the size of 1 mm×1 mm were formed, and "CELLOTAPE" (registered trademark) (manufactured by Nichiban Co., Ltd., CT405AP) was taped and pressed with a hand roller under the load of 1.5 kg/cm², and then rapidly peeled off in the 90-degree direction with respect to the ink-laminated film. The adhesion property was evaluated on a four-scale system according to the number of remaining cross cuts.
A: 100 cross cuts remained
B: 80 to 99 cross cuts remained
C: 50 to 79 cross cuts remained
D: 0 to less than 50 cross cuts remained

(10) Attachment Property with Metal Sheet

On the side of the film to be evaluated of the laminated metal sheet obtained in the same way as in (6), 100 cross cuts the size of 1 mm×1 mm were formed and evaluated in the same way as in (9).

(11) Base Coverage Property

On a tin free steel sheet (steel sheet) heated to a temperature 5° C. lower than the melting point, three lines having the length of 50 mm and the width of 0.3 mm, 1 mm and 1.5 mm respectively were drawn with a black permanent marker. The tin steel sheet was heated to a temperature 5° C. lower than the melting point of the film, and then the film was laminated on the sheet using a rubber roll. The resulting laminated steel sheet was observed visually, and evaluated according to the following criteria.

A: None of the three lines was visually observed.
B: Only one of the three lines was visually observed.
C: Two of the three lines were visually observed.
D: All the three lines were visually observed.

(12) Curling Resistance

A film cut out into a size of 10 cm×10 cm was placed on a flat glass sheet, and the amount of the rise of four corners in the direction perpendicular to the glass sheet surface was measured. The biggest curling height among the four corners was evaluated according to the following criteria.

A: The curling height of less than 1 mm.
B: The curling height of 1 mm or more and less than 3 mm
C: The curling height of 3 mm or more.

(13) Coefficient of Variation of Water Contact Angle

A film after 24 hours of humidity adjustment under the conditions of 23° C. and 65% RH was measured ten times for the water contact angle, using a contact angle meter (manufactured by Kyowa Interface Science Co., Ltd., CA-D type). The measurement was carried out 10 times. In a range of 200 mm×200 mm, the same position was not measured 2 times or more, and thus the position was changed every time. For the obtained measured values of water contact angles from ten measurements, a standard deviation and arithmetic average value were calculated, and a value (%) was obtained by dividing the standard deviation by the arithmetic average value.

(14) Intrinsic Viscosity of Polyesters

Polyester was dissolved in ortho-chlorophenol, and the limiting viscosity of the polyester resin and film measured at 25° C., using an Ostwald viscometer. In the case of a laminated film, the intrinsic viscosity of each single layer can be measured by scraping off each layer of the film according to the laminate thickness.

(15) Wax Content Per Unit Area

After each layer of the film was scraped off, the mass concentration ($\mu g/cm^3$) of the wax was quantified by a Fourier transform infrared spectroscopic method-total reflection method. Using FTS-60A/896 (manufactured by GIGILAB, FT-IR) as a spectroscope and ZnSE (zinc selenide) as an IR element (prism), light was reflected once at an incident angle of 60° for the measurement. The resolution was 4 cm$^{-1}$ and the cumulative number was 256 times. The quantification was carried out using the intensity ratio of the peak near the C—H stretching vibration band 2850 cm$^{-1}$ from the wax to the peak near 3050 cm$^{-1}$ from a benzene ring of the polyester. For quantification, a standard curve created using several samples in which the wax mass concentrations ($\mu g/cm^{-1}$) were changed in advance was utilized. The mass concentration ($\mu g/cm^3$) of the wax obtained from the quantification was multiplied by the thickness (cm) of each layer extracted in (3), and thus the wax content ($\mu g/cm^2$) contained per unit area of each layer of the film was obtained.

(16) Melting Point of Film

The measurement and analysis were carried out according to JIS K7121-1987, JIS K7122-1987, using a differential scanning calorimetry (manufactured by Seiko Instruments & Electronics Ltd., RDC220). 5 mg of the polyester film was used as a sample and heated from 25° C. to 300° C. in increments of 20° C./min. The temperature of the heat absorption peak obtained from the resulting DSC curve was used as a melting point of the film. When 2 or more melting points were observed, the biggest heat absorption peak was used as a melting point of the film.

(17) Surface Roughness

A surface roughness measuring instrument (manufactured by Kosaka Laboratory Ltd., SE4000) was used to measure the both sides. The measurement was performed under the conditions of the tip radius of the stylus of 0.5 $\mu$m, the measuring force of 100 $\mu$N, the measuring length of 1 mm, the low range cut-off of 0.200 mm, the high range cut-off of 0.000 mm, and the arithmetic average roughness SRa (nm) was obtained according to JIS B0601-2001.

In Reference Comparison Examples 51 to 62 and Reference Comparison Examples 1 to 7, a three-dimensional surface roughness measuring instrument (manufactured by Kosaka Laboratory Ltd., ET4000AK) was used to perform the measurement by a stylus method under the following conditions. The surface roughness (SRa) represents an average value of the absolute values of the differences between the height of a rough curved surface and the height of the central plane of the rough curved surface. For the surface roughness (SRa), both surfaces of the film are measured and the lower value is used.

Stylus diameter 2 ($\mu$mR)
Stylus pressure 10 (mg)
Measuring length 500 ($\mu$m)
Longitudinal magnification 20000 (times)
CUT OFF 250 ($\mu$m)
Measurement rate 100 ($\mu$m/s)
Measuring gap 5 ($\mu$m)
Recorded number 80
Hysteresis width±6.25 (nm)
Standard area 0.1 (mm$^2$).

(18) Glossiness

Following the method defined in JIS Z-8741-1997, a glossmeter (manufactured by Suga Test Instruments Co., Ltd., digital deformation glossmeter UGV-5D) was used to measure the specular glossiness at an angle of 60°. The measurement was performed 10 times (n=10), and the measured values from 8 measurements excluding the maximum value and minimum value were averaged and the average value was used as the glossiness.

(19) Thermal Shrinkage Ratio at 190° C. in 20 Minutes

The film was cut out into a rectangle of the length 70 mm×width 10 mm in one arbitrary direction X and the direction Y at a right angle to the direction X respectively, and used as a sample. Marked lines were drawn on the sample at an interval of 50 mm, and a weight of 3 g was hung. The sample was then placed for 20 minutes in a hot air oven heated at 190° C. and thus subjected to a heating treatment. The distance between marked lines after the thermal treatment were measured and, utilizing the change in the distance between marked lines before and after heating, thermal shrinkage ratio was calculated from the following formula. The measurement was performed on three samples in the direction X and the direction Y for each film, and the average value was used for the evaluation.

Thermal shrinkage ratio (%)={(the distance between marked lines before the heating treatment)−(the distance between marked lines after the heating treatment)}/(the distance between marked lines before the heating treatment)×100.

(20) Elongation at Break, Strength at Break

The film was cut out into a rectangle of the length 150 mm×width 10 mm (direction X×direction Y) wherein one arbitrary in-plane direction on the film is the direction X and the direction at a right angle to the direction X is the direction Y, and used as a sample. A tension tester (manufactured by ORIENTEC CORPORATION, Tenshiron UCT-100) was used to perform a tension test with an initial distance between tension chucks of 50 mm (L0) and a tension rate of 300 mm/min. The distance between chucks (L) when the sample fractured was thus obtained. The values calculated from the formula (L−L0)/L0×100 after ten measurements were averaged and the average value was used as the elongation at break (%) in the direction X. The strength measured right before the fracture was considered as the strength at break (MPa). The film was cut out into a rectangle the size of 150 mm×10 mm (the direction Y×the direction X) to produce a sample, and the elongation at break in the direction Y was also obtained in the same way.

(21) Rate of Change in Glossiness after 50% Stretching

A film stretching machine (manufactured by Bruickner Maschinenbau, KARO-IV) was used to measure the sample produced according to the following criteria for the film surface appearance after the film was stretched under the conditions as below, and the glossiness was evaluated. Initial sample: 100 mm×100 mm, preheating-stretching temperature: 120° C., preheating duration: 20 s, the stretching rate: 20%/s, the stretching ratio: 2 times×1 time The rate of change in glossiness (%)=|glossiness before the stretching−glossiness after the stretching|/glossiness before the stretching×100

(22) Rate of Change in Glossiness after Ten-Minute Thermal Treatment at 120° C.

A sample cut out into a size of 100 mm×100 mm was hung from the central portion of the ceiling of a hot air oven set at 120° C. and left for 10 minutes. Ten minutes later, the sample was taken out and the glossiness was evaluated.

The rate of change in glossiness (%) after the ten-minute thermal treatment at 120° C.=|glossiness before the thermal treatment−glossiness after the thermal treatment|/glossiness before the thermal treatment×100

(23) Molding Property Evaluation

The laminated steel sheet obtained in (11) was drawing-processed at a drawing ratio of 3, and the resulting can was observed visually and evaluated according to the following criteria.
A: No fracture or crack of the film portion was observed on the film surface.
B: A fracture or crack of the film portion of 2 mm or less was observed on the film surface.
C: A fracture or crack of the film portion of more than 2 mm and 5 mm or less was observed on the film surface.
D: A fracture or crack of the film portion of more than 5 mm was observed on the film surface.

(24) Glossy Appearance Evaluation

The can obtained in (23) was evaluated according to the following criteria.
A: When a fluorescent light is projected on the can, the figure of the whole can surface is clearly visible.
B: When a fluorescent light is projected on the can, the figure of either the base surface or the drum surface of the can is vaguely visible while the other is clearly visible. The glossy appearance is insufficient while the other shows a sufficiently glossy appearance.
C: When a fluorescent light is projected on the can, the figure of the whole can surface is vaguely visible.
D: When a fluorescent light is projected on the can, at least one surface of the base surface and the drum surface of the can is so rough that the figure is rarely visible.

(25) Ratio of Cumulative Thickness of Voids in Layer B to Film Thickness in Laminate Thickness Direction A photo of a cross section was taken as in (3), and five straight lines were drawn at random in the laminate thickness direction. Afterwards, one arbitrary straight line was drawn in parallel with the thickness direction, and the ratio of the cumulative thickness (µm) (V1) in which the thicknesses of all the voids present on the straight line were added up to the film thickness (T1) was calculated according to formula (1). The ratios for the five lines drawn randomly were also calculated in the same way, and the average value was obtained.

$$V1/T1 \times 100 \qquad (1)$$

(26) Ratio of Cumulative Void Length in in-Plane Direction to Film Length of 30 µm in in-Plane Direction.

As in (3), a photo of a cross section was taken, and five arbitrary straight lines were randomly drawn in parallel with the in-plane direction. The cumulative value (V2) of the void lengths (µm) in the in-plane direction of all the voids present within the film length of 30 µm on the arbitrary straight lines was obtained. The ratio of the cumulative value to 30 µm in the in-plane direction was calculated by formula (2). The ratios for the five lines drawn arbitrarily were also calculated in the same way, and the average value was obtained.

$$V2/30 \times 100 \qquad (2)$$

(27) Void Area Ratio

A photo of a cross section was taken as in (3), and only the hollow portions were traced on a transparent film, and the area of the voids (µm$^2$) found in the film cross section of the thickness of 20 µm×the length of 30 µm was then obtained, using an image analyzer (LUZEX II) manufactured by Nireco Corporation). The area ratio of this area to the film area (600 µm$^2$) (void area/film area) was obtained. Photos of cross sections of five sites arbitrarily selected from different measured fields of view from each other were used to calculate an average value.

(28) Coefficient of Static Friction µs

A slip tester (ASTM D 1894-63) was used for the measurement under the conditions of a weight of 200 g, contact area of 7500×7500 mm$^2$, travel rate of 150 mm/min, travel distance of 5 mm, and initial travel distance of 10 mm.

(29) Print Property (Aesthetic Property) Evaluation

An ink obtained by mixing a polyester resin and a melamine resin was applied on the laminated steel sheet obtained in (11) by use of a bar coater, and the resulting sheet was dried at 160° C. for 10 minutes, and a print was performed thereon. The aesthetic property after the print was evaluated as follows.
⊚: The print is clear and no defect is observed.
○: The print is clear and a defect is rarely observed.
×: The print is unclear and a defect is also observed.

(30) Detachability

A mold having a height of 30 mm and a width of 200 mm×200 mm was heated to 150° C. and the in-mold stamping was performed and the releasability was determined as follows.
⊚: The film does not attach to the mold at all, and can be taken off smoothly.
×: Some portions are attached to the mold.

(31) Number-Average Particle Size, White Pigment Concentration

The thermoplastic resin was removed from the film surface by a plasma low-temperature ashing method to expose the particles. The ashing conditions are selected such that thermoplastic resin is subjected to ashing while the particles are not damaged. A scanning electron microscope (SEM) was used for the observation and the photo of the particles were processed with an image analyzer. A different site was observed, and when the number of particles reached 1000 or more, the numerical values were processed according to formula (3), and the number-average size D thus obtained was considered as the average particle size. In formula (3), Di represents the equivalent particle size of particles and N represents the number of particles. At the same time, the white pigment concentration was determined, using an X-ray microanalyzer.

$$D=\Sigma Di/N \qquad (3)$$

(32) Mohs Hardness

A test piece having the same composition and structure as the particles added to a film for the Mohs hardness was used, or a mineral before being grounded into particles was used as a test piece. The test piece and the standard mineral for the Mohs hardness measurement were struck against each other, and it was measured according to whether a scratch was caused or not.

Production of Polyesters

The polyester resin subjected to the film production was prepared as follows.

Polyester A

Polyethylene terephthalate resin in which the terephthalic acid component as the dicarboxylic acid component is 100 mol %, and the ethylene glycol component as the glycol component is 100 mol % (intrinsic viscosity 0.65).

Polyester B

Isophthalic acid-copolymerized polyethylene terephthalate resin in which the terephthalic acid component and the isophthalic acid component as the dicarboxylic acid component are 96 mol % and 4 mol % respectively, and the ethylene glycol component as the glycol component is 100 mol % (intrinsic viscosity 0.7).

Pigment Master 1 (Pigment M1)

Polyethylene terephthalate pigment master obtained by including, in the polyester A, anatase titanium oxide particles with a number-average particle size of 1 μm at a particle concentration of 50% by mass (intrinsic viscosity 0.65).

Pigment Master 2 (Pigment M2)

Polyethylene terephthalate pigment master obtained by including, in the polyester A, rutile titanium oxide particles with a number-average particle size of 1 μm at a particle concentration of 50% by mass (intrinsic viscosity 0.65).

Pigment Master 3 (Pigment M3)

Isophthalic acid-copolymerized polyethylene terephthalate pigment master obtained by including, in the polyester A, anatase titanium oxide particles with a number-average particle size of 1 μm at a particle concentration of 50% by mass (intrinsic viscosity 0.65).

Wax Master 1 (Wax M1)

Polyethylene terephthalate wax master obtained by including carnauba wax in an amount of 10% by mass in the polyester A (intrinsic viscosity 0.62).

Wax Master 2 (Wax M2)

Polyethylene terephthalate wax master obtained by including polyethylene wax in an amount of 10% by mass in the polyester A (intrinsic viscosity 0.62).

Wax Master 3 (Wax M3)

Isophthalic acid-copolymerized polyethylene terephthalate wax master obtained by including carnauba wax in an amount of 10% by mass in the polyester B (intrinsic viscosity 0.67).

Polyester C

Polyethylene terephthalate resin in which the terephthalic acid component as the dicarboxylic acid component is 100 mol %, and the ethylene glycol component as the glycol component is 100 mol % (intrinsic viscosity 0.65).

Polyester D 1,4-cyclohexanedimethanol-copolymerized polyethylene terephthalate resin in which 1,4-cyclohexanedimethanol was copolymerized with the glycol component by 10 mol % (intrinsic viscosity 0.75).

Polyester E

Isophthalic acid-copolymerized polyethylene terephthalate resin in which the terephthalic acid component and the isophthalic acid component as the dicarboxylic acid component are 80.4 mol % and 19.6 mol % respectively, and the ethylene glycol component as the glycol component is 100 mol % (intrinsic viscosity 0.7).

White Pigment Master F

Polyethylene terephthalate white pigment master obtained by including, in the polyester C, anatase titanium oxide particles with a number-average particle size of 1 μm at a particle concentration of 50% by mass (intrinsic viscosity 0.65).

White Pigment Master G

Polyethylene terephthalate white pigment master obtained by including, in the polyester C, rutile titanium oxide particles with a number-average particle size of 1 μm at a particle concentration of 50% by mass (intrinsic viscosity 0.65).

Particle Master H

Polyethylene terephthalate particle master obtained by including, in the polyester C, aggregated silica particles with a number-average particle size of 2.2 μm at a particle concentration of 2% by mass (intrinsic viscosity 0.65).

Particle Master I

Polyethylene terephthalate particle master obtained by including, in the polyester C, calcium carbonate particles with a number-average particle size of 0.7 μm at a particle concentration of 2% by mass (intrinsic concentration 0.65).

Polyester J

Polyethylene terephthalate resin in which the terephthalic acid component as the dicarboxylic acid component is 100 mol %, and the ethylene glycol component as the glycol component is 100 mol % (intrinsic viscosity 0.65).

Polyester K

Isophthalic acid-copolymerized polyethylene terephthalate resin in which the terephthalic acid component and the isophthalic acid component as the dicarboxylic acid component are 80.4 mol % and 19.6 mol % respectively, and the ethylene glycol component as the glycol component is 100 mol % (intrinsic viscosity 0.7).

Wax Master Polyester L

Master polymer obtained by including 0.2% wt % of a carnauba wax component in the polyester J.

White Pigment Master M

Polyethylene terephthalate white pigment master obtained by including, in the polyester J, anatase titanium oxide particles with a number-average particle size of 0.2 μm at a particle concentration of 50 wt % (intrinsic viscosity 0.65).

White Pigment Master N

Polyethylene terephthalate white pigment master obtained by including, in the polyester J, anatase titanium oxide particles with a number-average particle size of 0.4 μm at a particle concentration of 50 wt % (intrinsic viscosity 0.65).

White Pigment Master O

Polyethylene terephthalate white pigment master obtained by including, in the polyester J, anatase titanium oxide particles with a number-average particle size of 2.0 μm at a particle concentration of 50 wt % (intrinsic viscosity 0.65).
White Pigment Master P Polyethylene terephthalate white pigment master obtained by including, in the polyester J, anatase titanium oxide particles with a number-average particle size of 0.05 μm at a particle concentration of 50 wt % (intrinsic viscosity 0.65).
White Pigment Master Q Polyethylene terephthalate white pigment master obtained by including, in the polyester J, anatase titanium oxide particles with a number-average particle size of 3 μm at a particle concentration of 50 wt % (intrinsic viscosity 0.65).
Particle Master R Polyethylene terephthalate particle master obtained by including, in the polyester J, aggregated silica particles with a number-average particle size of 2.2 μm at a particle concentration of 2 wt % (intrinsic viscosity 0.65).
Particle Master S Polyethylene terephthalate particle master obtained by including, in the polyester J, organic particles with a number-average particle size of 2.2 μm at a particle concentration of 2 wt % (intrinsic concentration 0.65).

Example 1

Raw materials were supplied in the compositions as in Table 2 into separate same-direction, vent-type twin screw extruders at an oxygen concentration of 0.2% by volume. The temperature of the cylinders of the layer A screw extruder, the layer B1 screw extruder, and the layer B2 screw extruder was set at 280° C. The raw materials for each layer were melted and joined to form a three-layer structure of the layer A/layer B/layer A in the feed block, and then, with the temperature of the short tube of 275° C. and the temperature of the mouth ring of 280° C., discharged via a T-die in the shape of a sheet onto a cooling drum which was temperature-controlled at 10° C. In doing so, static electricity was applied using wire-shaped electrodes having a diameter of 0.1 mm to attach the resulting film closely to the cooling drum, and a cool air at 15° C. was blown onto the polymers on the casting drum by use of an air chamber to obtain an unstretched sheet. Then, preheating was carried out in the longitudinal direction for 1.5 seconds at a preheating temperature of 85° C. The sheet was stretched in the longitudinal direction by 3 times at the stretching temperature of 115° C., and then immediately cooled with a metal roll with the temperature controlled at 40° C. Using a tenter-type transverse stretching machine, preheating was carried out for 1.5 seconds at the preheating temperature of 85° C., and then the sheet was stretched by 3.5 times in the transverse direction with the temperature of the first part of the stretching at 115° C., the temperature of the middle part of the stretching at 135° C., and the temperature of the later part of the stretching at 145° C. Then, in the tenter, the sheet was thermally treated for 10 seconds at the thermal treatment temperature of 200° C. while applying the relaxation of 5% in transverse direction to obtain a biaxially-oriented polyester film having the film thickness of 21 μm.

Examples 2 and 3

A biaxially-oriented polyester film was obtained in the same way as in Example 1 except that the thermal treatment conditions were changed as shown in Table 2.

Examples 4, 5, 6, 7, 8, 9, 10, 11, 12, 13, 14, 20, 21, and 22

A biaxially-oriented polyester film was obtained in the same way as in Example 1 except that the film structure was changed as shown in Tables 2, 3, 4 and 5.

Example 15

A biaxially-oriented polyester film was obtained in the same way as in Example 1 except that the temperature of cylinders of the layer A screw extruder, the layer B1 screw extruder, and the layer B2 screw extruder was 270° C., the temperature of the short tube was 265° C., and the temperature of the mouth ring was 270° C.

Example 16

A biaxially-oriented polyester film was obtained in the same way as in Example 1 except that the temperature of the cylinder of the layer A screw extruder was 270° C.

Example 17

A biaxially-oriented polyester film was obtained in the same way as in Example 1 except that the film structure and the thermal treatment conditions were changed as shown in Table 4.

Examples 18 and 19

A biaxially-oriented polyester film was obtained in the same way as in Example 17 except that the film structure was changed as shown in Tables 4 and 5.

Comparative Example 1

A biaxially-oriented polyester film was obtained in the same way as in Example 1 except that the film structure had a two-layer structure of the A layer/B1 layer as shown in Table 5-2.

Comparative Examples 2, 3, 4, 5, and 6

A biaxially-oriented polyester film was obtained in the same way as in Example 1 except that the structure and production conditions were changed as shown in Table 5-2.

Comparative Example 7

A biaxially-oriented polyester film was obtained in the same way as in Example 1 except that the controlled temperature of the cooling drum was 20° C. and a cool air by use of an air chamber was not blown.

TABLE 2

| | | | Example 1 | Example 2 | Example 3 |
|---|---|---|---|---|---|
| Film Structure | Polyester Layer B1 | — | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |

TABLE 2-continued

|  |  |  |  |  |  |  |
|---|---|---|---|---|---|---|
|  |  | Melting Point | ° C. | 255 | 255 | 255 |
|  |  | tb1 | μm | 3 | 3 | 3 |
|  |  | Wb1 | μg/Cm2 | 6.4 | 6.4 | 6.4 |
|  |  | Pigment Concentration | % by mass | 3 | 3 | 3 |
|  | Polyester Layer A | Composition | — | Polyester A (72% by mass) Pigment M1(28% by mass) | Polyester A (72% by mass) Pigment M1(28% by mass) | Polyester A (72% by mass) Pigment M1(28% by mass) |
|  |  | Melting Point | ° C. | 255 | 255 | 255 |
|  |  | ta | μm | 16 | 16 | 16 |
|  |  | Wa | μg/Cm2 | 0 | 0 | 0 |
|  |  | Pigment Concentration | % by mass | 14 | 14 | 14 |
|  | Polyester Layer B2 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
|  |  | Melting Point | ° C. | 255 | 255 | 255 |
|  |  | tb2 | μm | 2 | 2 | 2 |
|  |  | Wb2 | μg/Cm2 | 4.2 | 4.2 | 4.2 |
|  |  | Pigment Concentration | % by mass | 3 | 3 | 3 |
|  | Film Total Thickness t |  | μm | 21 | 21 | 21 |
| Production Conditions | Vertical Stretching Ratio |  | Times | 3 | 3 | 3 |
|  | Horizontal Stretching Ratio |  | Times | 3.5 | 3.5 | 3.5 |
|  | Thermal Treatment Temperature |  | ° C. | 200 | 210 | 220 |
|  | Thermal Treatment Duration |  | Seconds | 10 | 10 | 13 |
| Film Properties | Surface Free Energy (Layer B1) |  | mN/m | 41.5 | 41.5 | 41.5 |
|  | Surface Free Energy (Layer B2) |  | mN/m | 42.1 | 42.1 | 42.1 |
|  | Coefficient of Variation of Water Contact Angle (Layer B1) |  | % | 7.5 | 6 | 4 |
|  | Coefficient of Variation of Water Contact Angle (Layer B2) |  | % | 8.5 | 7 | 5 |
|  | Wb1 > Wa |  | — | ○ | ○ | ○ |
|  | Wb2 > Wa |  | — | ○ | ○ | ○ |
|  | Wb1 > Wb2 |  | — | ○ | ○ | ○ |
|  | Color Tone L Value |  | — | 73 | 73 | 73 |
|  | tb1/tb2 |  | — | 1.5 | 1.5 | 1.5 |
|  | |tb1 − tb2| |  | μm | 1 | 1 | 1 |
|  | (tb1 + tb2)/t |  | — | 0.24 | 0.24 | 0.24 |
|  | Scratch Resistance |  | — | C | B | A |
|  | Quality After Processing |  | — | B | B | B |
|  | Dimensional Stability |  | — | B | B | B |
|  | Print Property |  | — | B | B | B |
|  | Attachment Property With Metal Sheet |  | — | B | B | B |
|  | Base Coverage Property |  | — | C | C | C |
|  | Curling Resistance |  | — | B | B | B |

|  |  |  |  | Example 4 | Example 5 | Example 6 |
|---|---|---|---|---|---|---|
| Film Structure | Polyester Layer B1 |  | — | Polyester A (49% by mass) Pigment M1 (6% by mass) Wax M1 (45% by mass) | Polyester A (64% by mass) Pigment M1 (6% by mass) Wax M1 (30% by mass) | Polyester A (64% by mass) Pigment M1 (6% by mass) Wax M1 (30% by mass) |
|  |  | Melting Point | ° C. | 255 | 255 | 255 |
|  |  | tb1 | μm | 3 | 3 | 3 |
|  |  | Wb1 | μg/Cm2 | 9.6 | 6.4 | 6.4 |
|  |  | Pigment Concentration | % by mass | 3 | 3 | 3 |
|  | Polyester Layer A | Composition | — | Polyester A (72% by mass) Pigment M1(28% by mass) | Polyester A (71% by mass) Pigment M1(28% by mass) Wax M1 (1% by mass) | Polyester A (70% by mass) Pigment M1(28% by mass) Wax M1 (2% by mass) |
|  |  | Melting Point | ° C. | 255 | 255 | 255 |
|  |  | ta | μm | 16 | 16 | 16 |
|  |  | Wa | μg/Cm2 | 0 | 1.1 | 2.2 |
|  |  | Pigment Concentration | % by mass | 14 | 14 | 14 |
|  | Polyester Layer B2 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
|  |  | Melting Point | ° C. | 255 | 255 | 255 |
|  |  | tb2 | μm | 2 | 2 | 2 |
|  |  | Wb2 | μg/Cm2 | 4.2 | 4.2 | 4.2 |
|  |  | Pigment Concentration | % by mass | 3 | 3 | 3 |
|  | Film Total Thickness t |  | μm | 21 | 21 | 21 |
| Production Conditions | Vertical Stretching Ratio |  | Times | 3 | 3 | 3 |
|  | Horizontal Stretching Ratio |  | Times | 3.5 | 3.5 | 3.5 |
|  | Thermal Treatment Temperature |  | ° C. | 200 | 200 | 200 |
|  | Thermal Treatment Duration |  | Seconds | 10 | 10 | 10 |

TABLE 2-continued

|  |  |  |  |  |  |
|---|---|---|---|---|---|
| Film Properties | Surface Free Energy (Layer B1) | mN/m | 40.3 | 40.3 | 39.2 |
|  | Surface Free Energy (Layer B2) | mN/m | 42.1 | 40.8 | 39.7 |
|  | Coefficient of Variation of Water Contact Angle (Layer B1) | % | 3 | 7 | 6.5 |
|  | Coefficient of Variation of Water Contact Angle (Layer B2) | % | 6.5 | 8 | 7.5 |
|  | Wb1 > Wa | — | ○ | ○ | ○ |
|  | Wb2 > Wa | — | ○ | ○ | ○ |
|  | Wb1 > Wb2 | — | ○ | ○ | ○ |
|  | Color Tone L Value | — | 73 | 73 | 73 |
|  | tb1/tb2 | — | 1.5 | 1.5 | 1.5 |
|  | |tb1 − tb2| | μm | 1 | 1 | 1 |
|  | (tb1 + tb2)/t | — | 0.24 | 0.24 | 0.24 |
|  | Scratch Resistance | — | A | C | B |
|  | Quality After Processing | — | B | B | B |
|  | Dimensional Stability | — | B | B | B |
|  | Print Property | — | B | B | B |
|  | Attachment Property With Metal Sheet | — | B | B | B |
|  | Base Coverage Property | — | C | C | C |
|  | Curling Resistance | — | B | B | B |

TABLE 3

|  |  |  |  | Example 7 | Example 8 | Example 9 |
|---|---|---|---|---|---|---|
| Film Structure | Polyester Layer B1 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (70% by mass) Wax M1 (30% by mass) |
|  |  | Melting Point | ° C. | 255 | 255 | 255 |
|  |  | tb1 | μm | 5 | 2 | 3 |
|  |  | Wb1 | μg/Cm2 | 10.7 | 4.2 | 6.4 |
|  |  | Pigment Concentration | % by mass | 3 | 3 | 0 |
|  | Polyester Layer A | Composition | — | Polyester A (62% by mass) Pigment M1(38% by mass) | Polyester A (72% by mass) Pigment M1(28% by mass) | Polyester A (72% by mass) Pigment M1(28% by mass) |
|  |  | Melfing Point | ° C. | 255 | 255 | 255 |
|  |  | ta | μm | 16 | 18 | 16 |
|  |  | Wa | μg/Cm2 | 0 | 0 | 0 |
|  |  | Pigment Concentration | % by mass | 19 | 14 | 14 |
|  | Polyester Layer B2 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (70% by mass) Wax M1 (30% by mass) |
|  |  | Melfing Point | ° C. | 255 | 255 | 255 |
|  |  | tb2 | μm | 3 | 1 | 2 |
|  |  | Wb2 | μg/Cm2 | 6.4 | 2.1 | 4.2 |
|  |  | Pigment Concentration | % by mass | 3 | 3 | 0 |
|  | Film Total Thickness t | | μm | 24 | 21 | 21 |
| Production Conditions | Vertical Stretching Ratio | | Times | 3 | 3 | 3 |
|  | Horizontal Stretching Ratio | | Times | 3.5 | 3.5 | 3.5 |
|  | Thermal Treatment Temperature | | ° C. | 200 | 200 | 200 |
|  | Thermal Treatment Duration | | Seconds | 10 | 10 | 10 |
| Film Properties | Surface Free Energy (Layer B1) | | mN/m | 37.8 | 41.5 | 41.5 |
|  | Surface Free Energy (Layer B2) | | mN/m | 41.5 | 42.1 | 45.6 |
|  | Coefficient of Variation of Water Contact Angle (Layer B1) | | % | 3 | 8 | 7.5 |
|  | Coefficient of Variation of Water Contact Angle (Layer B2) | | % | 6 | 9 | 8.5 |
|  | Wb1 > Wa | | — | ○ | ○ | ○ |
|  | Wb2 > Wa | | — | ○ | ○ | ○ |
|  | Wb1 > Wb2 | | — | ○ | ○ | ○ |
|  | Color Tone L Value | | — | 75 | 78 | 71 |
|  | tb1/tb2 | | — | 1.7 | 2.0 | 1.5 |
|  | |tb1 − tb2| | | μm | 2 | 1 | 1 |
|  | (tb1 + tb2)/t | | — | 0.33 | 0.14 | 0.24 |
|  | Scratch Resistance | | — | A | C | B |
|  | Quality After Processing | | — | B | C | B |
|  | Dimensional Stability | | — | B | B | B |
|  | Print Property | | — | C | B | B |
|  | Attachment Property With Metal Sheet | | — | C | B | B |
|  | Base Coverage Property | | — | C | B | C |
|  | Curling Resistance | | — | B | A | B |

TABLE 3-continued

|  |  |  |  | Example 10 | Example 11 | Example 12 |
|---|---|---|---|---|---|---|
| Film Structure | Polyester Layer B1 | Composition | — | Polyester A (64% by mass) Pigment M2 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M2 (30% by mass) |
|  |  | Melting Point | °C. | 255 | 255 | 255 |
|  |  | tb1 | μm | 3 | 3 | 3 |
|  |  | Wb1 | μg/Cm2 | 6.4 | 6.4 | 6.4 |
|  |  | Pigment Concentration | % by mass | 3 | 3 | 3 |
|  | Polyester Layer A | Composition | — | Polyester A (72% by mass) Pigment M2(28% by mass) | Polyester A (60% by mass) Pigment M1(40% by mass) | Polyester A (72% by mass) Pigment M1(28% by mass) |
|  |  | Melfing Point | °C. | 255 | 255 | 255 |
|  |  | ta | μm | 16 | 16 | 16 |
|  |  | Wa | μg/Cm2 | 0 | 0 | 0 |
|  |  | Pigment Concentration | % by mass | 14 | 20 | 14 |
|  | Polyester Layer B2 | Composition | — | Polyester A (64% by mass) Pigment M2 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M2 (30% by mass) |
|  |  | Melfing Point | °C. | 255 | 255 | 255 |
|  |  | tb2 | μm | 2 | 2 | 2 |
|  |  | Wb2 | μg/Cm2 | 4.2 | 4.2 | 4.2 |
|  |  | Pigment Concentration | % by mass | 3 | 3 | 3 |
|  | Film Total Thickness t |  | μm | 21 | 21 | 21 |
| Production Conditions | Vertical Stretching Ratio |  | Times | 3 | 3 | 3 |
|  | Horizontal Stretching Ratio |  | Times | 3.5 | 3.5 | 3.5 |
|  | Thermal Treatment Temperature |  | °C. | 200 | 200 | 200 |
|  | Thermal Treatment Duration |  | Seconds | 10 | 10 | 10 |
| Film Properties | Surface Free Energy (Layer B1) |  | mN/m | 41.5 | 41.5 | 41.5 |
|  | Surface Free Energy (Layer B2) |  | mN/m | 42.1 | 42.1 | 42.1 |
|  | Coefficient of Variation of Water Contact Angle (Layer B1) |  | % | 7.5 | 7.5 | 8.5 |
|  | Coefficient of Variation of Water Contact Angle (Layer B2) |  | % | 8.5 | 8.5 | 9.5 |
|  | Wb1 > Wa |  | — | ○ | ○ | ○ |
|  | Wb2 > Wa |  | — | ○ | ○ | ○ |
|  | Wb1 > Wb2 |  | — | ○ | ○ | ○ |
|  | Color Tone L Value |  | — | 76 | 85 | 73 |
|  | tb1/tb2 |  | — | 1.5 | 1.5 | 1.5 |
|  | |tb1 − tb2| |  | μm | 1 | 1 | 1 |
|  | (tb1 + tb2)/t |  | — | 0.24 | 0.24 | 0.24 |
|  | Scratch Resistance |  | — | C | C | C |
|  | Quality After Processing |  | — | B | B | B |
|  | Dimensional Stability |  | — | B | B | B |
|  | Print Property |  | — | B | B | B |
|  | Attachment Property With Metal Sheet |  | — | B | B | B |
|  | Base Coverage Property |  | — | B | A | C |
|  | Curling Resistance |  | — | B | B | B |

TABLE 4

|  |  |  |  | Example 13 | Example 14 | Example 15 |
|---|---|---|---|---|---|---|
| Film Structure | Polyester Layer B1 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester B (64% by mass) Pigment M3 (6% by mass) Wax M3 (30% by mass) |
|  |  | Melting Point | °C. | 255 | 255 | 248 |
|  |  | tb1 | μm | 6 | 2 | 3 |
|  |  | Wb1 | μg/Cm2 | 12.8 | 4.2 | 6.4 |
|  |  | Pigment Concentration | % by mass | 3 | 3 | 3 |
|  | Polyester Layer A | Composition | — | Polyester A (72% by mass) Pigment M1 (28% by mass) | Polyester A (72% by mass) Pigment M1 (28% by mass) | Polyester B (72% by mass) Pigment M3 (28% by mass) |
|  |  | Melting Point | °C. | 255 | 255 | 248 |
|  |  | ta | μm | 32 | 6 | 16 |
|  |  | Wa | μg/Cm2 | 0 | 0 | 0 |
|  |  | Pigment Concentration | % by mass | 14 | 14 | 14 |

TABLE 4-continued

|  |  |  |  |  |  |  |
|---|---|---|---|---|---|---|
| | Polyester Layer B2 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester B (64% by mass) Pigment M3 (6% by mass) Wax M3 (30% by mass) |
| | | Melting Point | °C. | 255 | 255 | 248 |
| | | tb2 | μm | 4 | 1 | 2 |
| | | Wb2 | μg/Cm2 | 8.4 | 2.1 | 4.2 |
| | | Pigment Concentration | % by mass | 3 | 3 | 3 |
| | Film Total Thickness t | | μm | 42 | 9 | 21 |
| Production Conditions | Vertical Stretching Ratio | | Times | 3 | 3 | 3 |
| | Horizontal Stretching Ratio | | Times | 3.5 | 3.5 | 3.5 |
| | Thermal Treatment Temperature | | °C. | 200 | 200 | 200 |
| | Thermal Treatment Duration | | Seconds | 10 | 10 | 10 |
| Film Properties | Surface Free Energy (Layer B1) | | mN/m | 37.8 | 42.8 | 41.5 |
| | Surface Free Energy (Layer B2) | | mN/m | 42.1 | 43.6 | 42.1 |
| | Coefficient of Variation of Water Contact Angle (Layer B1) | | % | 2.5 | 9 | 7.5 |
| | Coefficient of Variation of Water Contact Angle (Layer B2) | | % | 7 | 10 | 8.5 |
| | Wb1 > Wa | | | ○ | ○ | ○ |
| | Wb2 > Wa | | | ○ | ○ | ○ |
| | Wb1 > Wb2 | | | ○ | ○ | ○ |
| | Color Tone L Value | | — | 82 | 67 | 73 |
| | tb1/tb2 | | — | 1.5 | 2 | 1.5 |
| | |tb1 − tb2| | | μm | 2 | 1 | 1 |
| | (tb1 + tb2)/t | | — | 0.24 | 0.33 | 0.24 |
| | Scratch Resistance | | — | B | C | C |
| | Quality After Processing | | — | B | C | B |
| | Dimensional Stability | | — | A | C | C |
| | Print Property | | — | C | B | C |
| | Attachment Property With Metal Sheet | | — | C | B | B |
| | Base Coverage Property | | — | B | C | C |
| | Curling Resistance | | — | B | A | B |

|  |  |  |  | Example 16 | Example 17 | Example 18 |
|---|---|---|---|---|---|---|
| Film Structure | Polyester Layer B1 | Composition | — | Polyester A (64% by mass) Pigment M1 (6% by mass) Wax M1 (30% by mass) | Polyester A (55% by mass) Wax M1 (45% by mass) | Polyester A (55% by mass) Wax M1 (45% by mass) |
| | | Melting Point | °C. | 255 | 255 | 255 |
| | | tb1 | μm | 3 | 3 | 3 |
| | | Wb1 | μg/Cm2 | 6.4 | 9.6 | 9.6 |
| | | Pigment Concentration | % by mass | 3 | 0 | 0 |
| | Polyester Layer A | Composition | — | Polyester B (72% by mass) Pigment M3 (28% by mass) | Polyester A (60% by mass) Pigment M1 (40% by mass) | Polyester A (60% by mass) Pigment M1 (40% by mass) |
| | | Melting Point | °C. | 248 | 255 | 255 |
| | | ta | μm | 16 | 16 | 16 |
| | | Wa | μg/Cm2 | 0 | 0 | 0 |
| | | Pigment Concentration | % by mass | 14 | 20 | 20 |
| | Polyester Layer B2 | Composition | — | Polyester A (64% by mass) Pigment M1 (6% by mass) Wax M1 (30% by mass) | Polyester A (70% by mass) Wax M1 (30% by mass) | Polyester A (55% by mass) Wax M1 (45% by mass) |
| | | Melting Point | °C. | 255 | 255 | 255 |
| | | tb2 | μm | 2 | 2 | 3 |
| | | Wb2 | μg/Cm2 | 4.2 | 4.2 | 9.6 |
| | | Pigment Concentration | % by mass | 3 | 0 | 0 |
| | Film Total Thickness t | | μm | 21 | 21 | 22 |
| Production Conditions | Vertical Stretching Ratio | | Times | 3 | 3 | 3 |
| | Horizontal Stretching Ratio | | Times | 3.5 | 3.5 | 3.5 |
| | Thermal Treatment Temperature | | °C. | 200 | 220 | 220 |
| | Thermal Treatment Duration | | Seconds | 10 | 10 | 10 |
| Film Properties | Surface Free Energy (Layer B1) | | mN/m | 41.5 | 40.3 | 40.3 |
| | Surface Free Energy (Layer B2) | | mN/m | 42.1 | 42.1 | 40.3 |
| | Coefficient of Variation of Water Contact Angle (Layer B1) | | % | 7.5 | 3 | 3 |
| | Coefficient of Variation of Water Contact Angle (Layer B2) | | % | 8.5 | 4 | 3 |
| | Wb1 > Wa | | | ○ | ○ | ○ |
| | Wb2 > Wa | | | ○ | ○ | ○ |
| | Wb1 > Wb2 | | | ○ | ○ | x |
| | Color Tone L Value | | — | 73 | 85 | 85 |
| | tb1/tb2 | | — | 1.5 | 1.5 | 1 |
| | |tb1 − tb2| | | μm | 1 | 1 | 0 |
| | (tb1 + tb2)/t | | — | 0.24 | 0.24 | 0.27 |
| | Scratch Resistance | | — | C | A | A |
| | Quality After Processing | | — | B | B | B |

TABLE 4-continued

|  |  | | | |
|---|---|---|---|---|
| Dimensional Stability | — | B | B | B |
| Print Property | — | B | B | B |
| Attachment Property With Metal Sheet | — | C | A | B |
| Base Coverage Property | — | C | A | A |
| Curling Resistance | — | B | B | A |

TABLE 5

| | | | | Example 19 | Example 20 | Example 21 | Example 22 |
|---|---|---|---|---|---|---|---|
| Film Structure | Polyester Layer B1 | Composition | — | Polyester A (70% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
| | | Melting Point | °C. | 255 | 255 | 255 | 255 |
| | | tb1 | μm | 2 | 3 | 3 | 3 |
| | | Wb1 | μg/Cm2 | 4.2 | 6.4 | 6.4 | 6.4 |
| | | Pigment Concentration | % by mass | 0 | 3 | 3 | 3 |
| | Polyester Layer A | Composition | — | Polyester A (60% by mass) Pigment M1 (40% by mass) | Polyester A (72% by mass) Pigment M1 (28% by mass) | Polyester A (72% by mass) Pigment M1 (28% by mass) | Polyester A (94% by mass) Pigment M1 (6% by mass) |
| | | Melting Point | °C. | 255 | 255 | 255 | 255 |
| | | ta | μm | 16 | 16 | 16 | 16 |
| | | Wa | μg/Cm2 | 0 | 0 | 0 | 0 |
| | | Pigment Concentration | % by mass | 20 | 14 | 14 | 3 |
| | Polyester Layer B2 | Composition | — | Polyester A (70% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
| | | Melting Point | °C. | 255 | 255 | 255 | 255 |
| | | tb2 | μm | 2 | 3 | 2.7 | 2 |
| | | Wb2 | μg/Cm2 | 4.2 | 6.4 | 5.7 | 4.2 |
| | | Pigment Concentration | % by mass | 0 | 3 | 3 | 3 |
| | Film Total Thickness t | | μm | 20 | 22 | 21.7 | 21 |
| Production Conditions | Vertical Stretching Ratio | | Times | 3 | 3 | 3 | 3 |
| | Horizontal Stretching Ratio | | Times | 3.5 | 3.5 | 3.5 | 3.5 |
| | Thermal Treatment Temperature | | °C. | 220 | 200 | 200 | 200 |
| | Thermal Treatment Duration | | Seconds | 10 | 10 | 10 | 10 |
| Film Properties | Surface Free Energy (Layer B1) | | mN/m | 42.1 | 41.5 | 41.5 | 41.5 |
| | Surface Free Energy (Layer B2) | | mN/m | 42.1 | 41.5 | 41.7 | 42.1 |
| | Coefficient of Variation of Water Contact Angle (Layer B1) | | % | 4 | 7.5 | 7.5 | 7.5 |
| | Coefficient of Variation of Water Contact Angle (Layer B2) | | % | 4 | 7.5 | 8 | 8.5 |
| | Wb1 > Wa | | — | ○ | ○ | ○ | ○ |
| | Wb2 > Wa | | — | ○ | ○ | ○ | ○ |
| | Wb1 > Wb2 | | — | x | x | x | ○ |
| | Color Tone L Value | | — | 85 | 74 | 74 | 64 |
| | tb1/tb2 | | — | 1 | 1 | 1.1 | 1.5 |
| | \|tb1 − tb2\| | | μm | 0 | 0 | 0.3 | 1 |
| | (tb1 + tb2)/t | | — | 0.20 | 0.27 | 0.26 | 0.24 |
| | Scratch Resistance | | — | B | C | C | C |
| | Quality After Processing | | — | B | B | B | B |
| | Dimensional Stability | | — | B | B | B | B |
| | Print Property | | — | B | B | B | B |
| | Attachment Property With Metal Sheet | | — | A | C | B | B |
| | Base Coverage Property | | — | A | C | C | D |
| | Curling Resistance | | — | B | A | B | B |

TABLE 5-2

|  |  |  |  | Comparative Example 1 | Comparative Example 2 | Comparative Example 3 | Comparative Example 4 |
|---|---|---|---|---|---|---|---|
| Film Structure | Polyester Layer B1 | Composition | — | Polyester A (64% by mass) Pigment M1 (6% by mass) Wax M1 (30% by mass) | Polyester A (94% by mass) Pigment M1 (6% by mass) | Polyester A (64% by mass) Pigment M1 (6% by mass) Wax M1 (30% by mass) | Polyester A (64% by mass) Pigment M1 (6% by mass) Wax M1 (30% by mass) |
|  |  | Melting Point | °C. | 255 | 255 | 255 | 255 |
|  |  | tb1 | μm | 3 | 3 | 3 | 3 |
|  |  | Wb1 | μg/Cm2 | 6.4 | 0 | 6.4 | 6.4 |
|  |  | Pigment Concentration | % by mass | 3 | 3 | 3 | 3 |
|  | Polyester Layer A | Composition | — | Polyester A (72% by mass) Pigment M1(28% by mass) | Polyester A (72% by mass) Pigment M1(28% by mass) | Polyester A (72% by mass) Pigment M1(28% by mass) | Polyester A (72% by mass) Pigment M1(28% by mass) |
|  |  | Melting Point | °C. | 255 | 255 | 255 | 255 |
|  |  | ta | μm | 16 | 16 | 16 | 16 |
|  |  | Wa | μg/Cm2 | 0 | 0 | 0 | 0 |
|  |  | Pigment Concentration | % by mass | 14 | 14 | 14 | 14 |
|  | Polyester Layer B2 | Composition | — | — | Polyester A (64% by mass) Pigment M1 (6% by mass) Wax M1 (30% by mass) | Polyester A (94% by mass) Pigment M1 (6% by mass) | Polyester A (64% by mass) Pigment M1 (6% by mass) Wax M1 (30% by mass) |
|  |  | Melting Point | °C. | — | 255 | 255 | 255 |
|  |  | tb2 | μm | — | 2 | 2 | 2 |
|  |  | Wb2 | μg/Cm2 | — | 4.2 | 0 | 4.2 |
|  |  | Pigment Concentration | % by mass | — | 3 | 3 | 3 |
| Production Conditions | Film Total Thickness t | | μm | 19 | 21 | 21 | 21 |
|  | Vertical Stretching Ratio | | Times | 3 | 3 | 3 | 3 |
|  | Horizontal Stretching Ratio | | Times | 3.5 | 3.5 | 3.5 | 3.5 |
|  | Thermal Treatment Temperature | | °C. | 200 | 200 | 200 | 190 |
|  | Thermal Treatment Duration | | Seconds | 10 | 10 | 10 | 10 |
| Film Properties | Surface Free Energy (Layer B1) | | mN/m | 41.5 | 45.6 | 41.5 | 41.5 |
|  | Surface Free Energy (Layer B2) | | mN/m | — | 42.1 | 45.6 | 42.1 |
|  | Coefficient of Variation of Water Contact Angle (Layer B1) | | % | 7.5 | 7.5 | 7.5 | 12.5 |
|  | Coefficient of Variation of Water Contact Angle (Layer B2) | | % | — | 8.5 | 8.5 | 13.5 |
|  | Wb1 > Wa | | — | ○ | × | ○ | ○ |
|  | Wb2 > Wa | | — | — | ○ | × | ○ |
|  | Wb1 > Wb2 | | — | — | × | ○ | ○ |
|  | Color Tone L Value | | — | 73 | 73 | 73 | 73 |
|  | tb1/tb2 | | — | — | 1.5 | 1.5 | 1.5 |
|  | |tb1 − tb2| | | μm | — | 1 | 1 | 1 |
|  | (tb1 + tb2)/t | | — | — | 0.24 | 0.24 | 0.24 |
|  | Scratch Resistance | | — | B | D | B | D |
|  | Quality After Processing | | — | D | B | D | B |
|  | Dimensional Stability | | — | B | B | B | B |
|  | Print Property | | — | B | A | B | B |
|  | Attachment Property With Metal Sheet | | — | A | B | A | B |
|  | Base Coverage Property | | — | C | C | C | C |
|  | Curling Resistance | | — | C | C | C | B |

|  |  |  |  | Comparative Example 5 | Comparative Example 6 | Comparative Example 7 |
|---|---|---|---|---|---|---|
| Film Structure | Polyester Layer B1 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
|  |  | Melting Point | °C. | 255 | 255 | 255 |
|  |  | tb1 | μm | 3 | 3 | 3 |
|  |  | Wb1 | μg/Cm2 | 6.4 | 6.4 | 6.4 |
|  |  | Pigment Concentration | % by mass | 3 | 3 | 3 |
|  | Polyester Layer A | Composition | — | Polyester A (72% by mass) Pigment M1(28% by mass) | Polyester A (72% by mass) Pigment M1 (28% by mass) Wax M1 (6% by mass) | Polyester A (72% by mass) Pigment M1(28% by mass) |
|  |  | Melting Point | °C. | 255 | 255 | 255 |
|  |  | ta | μm | 16 | 16 | 16 |
|  |  | Wa | μg/Cm2 | 0 | 6.8 | 0 |
|  |  | Pigment Concentration | % by mass | 14 | 14 | 14 |

TABLE 5-2-continued

|  |  |  |  |  |  |
|---|---|---|---|---|---|
| | Polyester Layer B2 | Composition | — | Polyester A (64% by mass) Pigment M1 (6% by mass) Wax M1 (30% by mass) | Polyester A (64% by mass) Pigment M1 (6% by mass) Wax M1 (30% by mass) | Polyester A (64% by mass) Pigment M1 (6% by mass) Wax M1 (30% by mass) |
| | | Melting Point | °C. | 255 | 255 | 255 |
| | | tb2 | μm | 2 | 2 | 2 |
| | | Wb2 | μg/Cm2 | 4.2 | 4.2 | 4.2 |
| | | Pigment Concentration | % by mass | 3 | 3 | 3 |
| Production Conditions | Film Total Thickness t | | μm | 21 | 21 | 21 |
| | Vertical Stretching Ratio | | Times | 3 | 3 | 3 |
| | Horizontal Stretching Ratio | | Times | 3.5 | 3.5 | 3.5 |
| | Thermal Treatment Temperature | | °C. | 230 | 200 | 200 |
| | Thermal Treatment Duration | | Seconds | 6 | 10 | 10 |
| Film Properties | Surface Free Energy (Layer B1) | | mN/m | 41.5 | 41.5 | 41.8 |
| | Surface Free Energy (Layer B2) | | mN/m | 42.1 | 42.1 | 42.4 |
| | Coefficient of Variation of Water Contact Angle (Layer B1) | | % | 11.5 | 7.5 | 10.3 |
| | Coefficient of Variation of Water Contact Angle (Layer B2) | | % | 12.5 | 8.5 | 10.8 |
| | Wb1 > Wa | | — | ○ | × | ○ |
| | Wb2 > Wa | | — | ○ | × | ○ |
| | Wb1 > Wb2 | | — | ○ | ○ | ○ |
| | Color Tone L Value | | — | 73 | 73 | 73 |
| | tb1/tb2 | | — | 1.5 | 1.5 | 1.5 |
| | \|tb1 − tb\| | | μm | 1 | 1 | 1 |
| | (tb1 + tb2)/t | | — | 0.24 | 0.24 | 0.24 |
| | Scratch Resistance | | — | D | C | D |
| | Quality After Processing | | — | B | A | B |
| | Dimensional Stability | | — | B | B | B |
| | Print Property | | — | B | D | B |
| | Attachment Property With Metal Sheet | | — | B | D | B |
| | Base Coverage Property | | — | C | C | C |
| | Curling Resistance | | — | B | B | B |

Reference Example 1

Raw materials were supplied in the composition as in Table 6 to a same-direction, vent-type twin screw extruder at an oxygen concentration of 0.2% by volume. The raw materials were melted with the temperature of the screw extruder cylinder of 280° C., and, with the mouth ring temperature of 280° C., discharged through a T-die in a sheet shape onto a cooling drum which was temperature-controlled at 10° C. In doing so, static electricity was applied using wire-shaped electrodes having a diameter of 0.1 mm to attach the resulting film closely to the cooling drum, and a cool air at 15° C. was blown onto the polymer on the casting drum by use of an air chamber to obtain an unstretched sheet. Then, preheating was carried out in the longitudinal direction for 1.5 seconds at a preheating temperature of 85° C. The sheet was stretched in the longitudinal direction by 3 times at the stretching temperature of 115° C., and then immediately cooled with a metal roll with the temperature controlled at 40° C. Using a tenter-type transverse stretching machine, preheating was carried out for 1.5 seconds at the preheating temperature of 85° C., and then the sheet was stretched by 3.5 times in the transverse direction with the temperature of the first part of the stretching at 115° C., the temperature of the middle part of the stretching at 135° C., and the temperature of the later part of the stretching at 145° C. Then, in the tenter, the sheet was thermally treated at the thermal treatment temperature of 210° C. while applying the relaxation of 5% in transverse direction to obtain a biaxially-oriented polyester film having the film thickness of 20 μm.

Reference Examples 2 and 3

A biaxially-oriented polyester film with a thickness of 20 μm was obtained in the same way as in Reference Example 1 except that the thermal treatment temperature was changed as shown in Table 6.

Reference Examples 4, 5, and 6

A biaxially-oriented polyester film was obtained in the same way as in Reference Example 1 except that the thickness was changed as shown in Table 6.

Reference Example 7

Raw materials were supplied in the compositions as in Table 7 to separate same-direction, vent-type twin screw extruders at an oxygen concentration of 0.2% by volume. The temperature of the cylinders of the layer A screw extruder and the layer B screw extruder were set at 280° C. and 270° C., respectively. The raw materials were melted and joined to form a three-layer structure of the layer A/layer B/layer A in the feed block, and then, with the temperature of the short tube of 275° C. and the temperature of the mouth ring of 280° C., discharged via a T-die in the shape of a sheet onto a cooling drum which was temperature-controlled at 10° C. After this, the same method as in Reference Example 1 was followed to obtain a biaxially-oriented polyester film with a thickness of 20 μm.

Reference Examples 8, 9, 10, 13, 14, 15, 16, and 17

A biaxially-oriented polyester film was obtained in the same way as in Reference Example 7 except that the composition was changed as shown in Tables 7 and 8.

Reference Examples 11 and 12

A biaxially-oriented polyester film was obtained in the same way as in Reference Example 7 except that the lamination ratio was changed as shown in Table 7.

Reference Comparison Examples 1, 2, 3, 5, and 7

A biaxially-oriented polyester film was obtained in the same way as in Reference Example 7 except that the composition, thickness and production conditions were changed as shown in Tables 8 and 9.

Reference Comparison Example 6

A biaxially-oriented polyester film was obtained in the same way as in Example 5 except that the thickness was changed as shown in Table 9.

Reference Comparison Example 4

A biaxially-oriented polyester film was obtained in the same way as in Reference Example 6 except that the thickness was changed as shown in Table 9.

TABLE 6

| | | | | Reference Example 1 | Reference Example 2 | Reference Example 3 |
|---|---|---|---|---|---|---|
| Film Structure | Polyester Layer A | Resin | — | Polyester C (61% by mass) White Pigment Master F (36% by mass) Particle Master H (3% by mass) | Polyester C (61% by mass) White Pigment Master F (36% by mass) Particle Master H (3% by mass) | Polyester C (61% by mass) White Pigment Master F (36% by mass) Particle Master H (3% by mass) |
| | | Composition | Glycol | EG (100 mol %) | EG (100 mol %) | EG (100 mol %) |
| | | | Dicarboxylic Acid | TPA (100 mol %) | TPA (100 mol %) | TPA (100 mol %) |
| | | Layer Melting Point | ° C. | 255 | 255 | 255 |
| | | Thickness of Single Layer | μm | 20 | 20 | 20 |
| | | White Pigment | Type | Anatase Titanium Oxide | Anatase Titanium Oxide | Anatase Titanium Oxide |
| | | | % by mass | 18 | 18 | 18 |
| | Polyester Layer B | Resin | — | — | — | — |
| | | Composition | Glycol | — | — | — |
| | | | Dicarboxylic Acid | — | — | — |
| | | Melting Point | ° C. | — | — | — |
| | | Thickness of Single Layer | μm | — | — | — |
| | | White Pigment | Type | — | — | — |
| | | | % by mass | — | — | — |
| | Structure | | — | A | A | A |
| | Layer Number | | Layer | 1 | 1 | 1 |
| | Film Thickness | | μm | 20 | 20 | 20 |
| | Film Melting Point | | ° C. | 255 | 255 | 255 |
| Production Conditions | Vertical Stretching Ratio | | Times | 3 | 3 | 3 |
| | Horizontal Stretching Ratio | | Times | 3.5 | 3.5 | 3.5 |
| | Thermal Treatment Temperature | | ° C. | 210 | 195 | 230 |
| Film Properties | Thermal Shrinkage Ratio at 190° C. in 20 min | Direction X (Sx) | % | 4 | 4.8 | 3 |
| | | Direction Y (Sy) | % | 3.1 | 4.5 | 2.8 |
| | | \|Sx − Sy\| | % | 0.9 | 0.3 | 0.2 |
| | Surface Roughness SRa | Layer A Side | nm | 35 | 35 | 35 |
| | | Layer B Side | nm | — | — | — |
| | Strength at break | Direction X (Fx) | Mpa | 132 | 135 | 126 |
| | | Direction Y (Fy) | MPa | 138 | 140 | 130 |
| | | \|Fx − Fy\| | MPa | 6 | 5 | 4 |
| | Elongation at break | Direction X (Lx) | % | 74 | 70 | 78 |
| | | Direction Y (Ly) | % | 70 | 65 | 73 |
| | | \|Lx − Ly\| | % | 4 | 5 | 5 |
| | L Value | | — | 82 | 82 | 82 |
| | Glossiness | | % | 81 | 81 | 81 |
| | Ten-minute Thermal Treatment at 120° C. Glossiness | Glossiness After Treatment | % | 68 | 66 | 71 |
| | | Rate of Change Before and After Treatment | % | 16.0 | 18.5 | 12.3 |
| | 50% Stretching Glossiness | Glossiness After Stretching | % | 63 | 61 | 65 |
| | | Rate of Change Before and After Stretching | % | 22.2 | 24.7 | 19.8 |
| | Processability Evaluation | | — | B | C | A |
| | Covering Property Evaluation | | — | B | B | B |
| | Molding Property Evaluation | | — | C | C | C |
| | Glossy Appearance Evaluation | | — | C | C | C |

TABLE 6-continued

| | | | | Reference Example 4 | Reference Example 5 | Reference Example 6 |
|---|---|---|---|---|---|---|
| Film Structure | Polyester Layer A | Resin | — | Polyester C (61% by mass) White Pigment Master F (36% by mass) Particle Master H (3% by mass) | Polyester C (61% by mass) White Pigment Master F (36% by mass) Particle Master H (3% by mass) | Polyester C (47% by mass) White Pigment Master F (50% by mass) Particle Master H (3% by mass) |
| | | Composition | Glycol | EG (100 mol %) | EG (100 mol %) | EG (100 mol %) |
| | | | Dicarboxylic Acid | TPA (100 mol %) | TPA (100 mol %) | TPA (100 mol %) |
| | | Layer Melting Point | °C. | 255 | 255 | 255 |
| | | Thickness of Single Layer | μm | 30 | 40 | 10 |
| | | White Pigment | Type | Anatase Titanium Oxide | Anatase Titanium Oxide | Anatase Titanium Oxide |
| | | | % by mass | 18 | 18 | 25 |
| | Polyester Layer B | Resin | — | — | — | — |
| | | Composition | Glycol | — | — | — |
| | | | Dicarboxylic Acid | — | — | — |
| | | Melting Point | °C. | — | — | — |
| | | Thickness of Single Layer | μm | — | — | — |
| | | White Pigment | Type | — | — | — |
| | | | % by mass | — | — | — |
| | Structure | | — | A | A | A |
| | Layer Number | | Layer | 1 | 1 | 1 |
| | Film Thickness | | μm | 30 | 40 | 10 |
| | Film Melting Point | | °C. | 255 | 255 | 255 |
| Production Conditions | Vertical Stretching Ratio | | Times | 3 | 3 | 3 |
| | Horizontal Stretching Ratio | | Times | 3.5 | 3.5 | 3.5 |
| | Thermal Treatment Temperature | | °C. | 210 | 210 | 210 |
| Film Properties | Thermal Shrinkage Ratio at 190° C. in 20 min | Direction X (Sx) | % | 3.7 | 3.5 | 4.7 |
| | | Direction Y (Sy) | % | 2.9 | 2.7 | 4.2 |
| | | \|Sx − Sy\| | % | 0.8 | 0.8 | 0.5 |
| | Surface Roughness SRa | Layer A Side | nm | 33 | 32 | 37 |
| | | Layer B Side | nm | — | — | — |
| | Strength at break | Direction X (Fx) | Mpa | 136 | 140 | 125 |
| | | Direction Y (Fy) | MPa | 143 | 145 | 122 |
| | | \|Fx − Fy\| | MPa | 7 | 5 | 3 |
| | Elongation at break | Direction X (Lx) | % | 78 | 82 | 72 |
| | | Direction Y (Ly) | % | 74 | 75 | 68 |
| | | \|Lx − Ly\| | % | 4 | 7 | 4 |
| | L Value | | — | 84 | 86 | 80 |
| | Glossiness | | % | 82 | 83 | 79 |
| | Ten-minute Thermal Treatment at 120° C. Glossiness | Glossiness After Treatment | % | 68 | 68 | 68 |
| | | Rate of Change Before and After Treatment | % | 17.1 | 18.1 | 13.9 |
| | 50% Stretching Glossiness | Glossiness After Stretching | % | 65 | 68 | 60 |
| | | Rate of Change Before and After Stretching | % | 20.7 | 18.1 | 24.1 |
| | Processability Evaluation | | — | A | A | A |
| | Covering Property Evaluation | | — | B | A | C |
| | Molding Property Evaluation | | — | C | C | C |
| | Glossy Appearance Evaluation | | — | C | C | C |

TABLE 7

| | | | | Reference Example 7 | Reference Example 8 | Reference Example 9 |
|---|---|---|---|---|---|---|
| Film Structure | Polyester Layer A | Resin | — | Polyester C (61% by mass) White Pigment Master F (36% by mass) Particle Master H (3% by mass) | Polyester C (51% by mass) White Pigment Master F (46% by mass) Particle Master H (3% by mass) | Polyester D (51% by mass) White Pigment Master F (46% by mass) Particle Master H (3% by mass) |
| | | Composition | Glycol | EG (100 mol %) | EG (100 mol %) | EG (94.9 mol %) CHDM (5.1 mol %) |
| | | | Dicarboxylic Acid | TPA (100 mol %) | TPA (100 mol %) | TPA (100 mol %) |

TABLE 7-continued

|  |  |  |  |  |  |  |
|---|---|---|---|---|---|---|
|  |  | Melting Point | ° C. | 255 | 255 | 247 |
|  |  | Thickness of Single Layer | μm | 16 | 16 | 16 |
|  |  | White Pigment | Type | Anatase Titanium Oxide | Anatase Titanium Oxide | Anatase Titanium Oxide |
|  |  |  | % by mass | 18 | 23 | 23 |
|  | Polyester Layer B | Resin | — | Polyester C (85% by mass) White Pigment Master F (12% by mass) Particle Master H (3% by mass) | Polyester C (97% by mass) Particle Master H (3% by mass) | Polyester C (97% by mass) Particle Master H (3% by mass) |
|  |  | Composition | Glycol | EG (100 mol %) | EG (100 mol %) | EG (100 mol %) |
|  |  |  | Dicarboxylic Acid | TPA (100 mol %) | TPA (100 mol %) | TPA (100 mol %) |
|  |  | Melting Point | ° C. | 255 | 255 | 255 |
|  |  | Thickness of Single Layer | μm | 2 | 2 | 2 |
|  |  | White Pigment | Type | Anatase Titanium Oxide | — | — |
|  |  |  | % by mass | 6 | 0 | 0 |
|  | Structure |  | — | B/A/B | B/A/B | B/A/B |
|  | Layer Number |  | Layer | 3 | 3 | 3 |
|  | Film Thickness |  | μm | 20 | 20 | 20 |
|  | Film Melting Point |  | ° C. | 255 | 255 | 247 |
| Production Conditions | Vertical Stretching Ratio |  | Times | 3 | 3 | 3 |
|  | Horizontal Stretching Ratio |  | Times | 3.5 | 3.5 | 3.5 |
|  | Thermal Treatment Temperature |  | ° C. | 210 | 210 | 200 |
| Film Properties | Thermal Shrinkage Ratio at 190° C. in 20 min | Direction X (Sx) | % | 3.4 | 3.1 | 4.7 |
|  |  | Direction Y (Sy) | % | 2.9 | 2.6 | 4.5 |
|  |  | $|Sx - Sy|$ | % | 0.5 | 0.5 | 0.2 |
|  | Surface Roughness SRa | Layer A Side | nm |  |  |  |
|  |  | Layer B Side | nm | 30 | 26 | 26 |
|  | Strength at break | Direction X (Fx) | MPa | 138 | 156 | 130 |
|  |  | Direction Y (Fy) | MPa | 143 | 167 | 128 |
|  |  | $|Fx - Fy|$ | MPa | 5 | 11 | 2 |
|  | Elongation at break | Direction X (Lx) | % | 120 | 160 | 185 |
|  |  | Direction Y (Ly) | % | 110 | 155 | 190 |
|  |  | $|Lx - Ly|$ | % | 10 | 5 | 5 |
|  | L Value |  | — | 80 | 84 | 84 |
|  | Glossiness |  | % | 84 | 98 | 98 |
|  | Ten-minute Thermal Treatment at 120° C. Glossiness | Glossiness After Treatment | % | 76 | 83 | 85 |
|  |  | Rate of Change Before and After Treatment | % | 9.5 | 15.3 | 13.3 |
|  | 50% Stretching Glossiness | Glossiness After Stretching | % | 69 | 82 | 83 |
|  |  | Rate of Change Before and After Stretching | % | 17.9 | 16.3 | 15.3 |
|  | Processability Evaluation |  | — | B | A | B |
|  | Covering Property Evaluation |  | — | B | A | A |
|  | Molding Property Evaluation |  | — | C | B | A |
|  | Glossy Appearance Evaluation |  | — | C | A | A |

|  |  |  |  | Reference Example 10 | Reference Example 11 | Reference Example 12 |
|---|---|---|---|---|---|---|
| Film Structure | Polyester Layer A | Resin | — | Polyester E (51% by mass) White Pigment Master F (46% by mass) Particle Master H (3% by mass) | Polyester C (51% by mass) White Pigment Master F (46% by mass) Particle Master H (3% by mass) | Polyester C (51% by mass) White Pigment Master F (46% by mass) Particle Master H (3% by mass) |
|  |  | Composition | Glycol | EG (100 mol %) | EG (100 mol %) | EG (100 mol %) |
|  |  |  | Dicarboxylic Acid | TPA (90 mol %) IPA(10 mol %) | TPA (100 mol %) | TPA (100 mol %) |
|  |  | Melting Point | ° C. | 235 | 255 | 255 |
|  |  | Thickness of Single Layer | μm | 16 | 18 | 14 |
|  |  | White Pigment | Type | Anatase Titanium Oxide | Anatase Titanium Oxide | Anatase Titanium Oxide |
|  |  |  | % by mass | 23 | 23 | 23 |

TABLE 7-continued

|  |  |  |  |  |  |  |
|---|---|---|---|---|---|---|
| | Polyester Layer B | Resin | — | Polyester C (97% by mass) Particle Master H (3% by mass) | Polyester C (97% by mass) Particle Master H (3% by mass) | Polyester C (97% by mass) Particle Master H (3% by mass) |
| | | Composition | Glycol | EG (100 mol %) | EG (100 mol %) | EG (100 mol %) |
| | | | Dicarboxylic Acid | TPA (100 mol %) | TPA (100 mol %) | TPA (100 mol %) |
| | | Melting Point | ° C. | 255 | 255 | 255 |
| | | Thickness of Single Layer | μm | 2 | 1 | 3 |
| | | White Pigment | Type | — | — | — |
| | | | % by mass | 0 | 0 | 0 |
| | Structure | | — | B/A/B | B/A/B | B/A/B |
| | Layer Number | | Layer | 3 | 3 | 3 |
| | Film Thickness | | μm | 20 | 20 | 20 |
| | Film Melting Point | | ° C. | 235 | 255 | 255 |
| Production Conditions | Vertical Stretching Ratio | | Times | 3 | 3 | 3 |
| | Horizontal Stretching Ratio | | Times | 3.5 | 3.5 | 3.5 |
| | Thermal Treatment Temperature | | ° C. | 195 | 210 | 210 |
| Film Properties | Thermal Shrinkage Ratio at 190° C. in 20 min | Direction X (Sx) | % | 4.9 | 3.3 | 3 |
| | | Direction Y (Sy) | % | 4.7 | 2.7 | 2.4 |
| | | \|Sx − Sy\| | % | 0.2 | 0.6 | 0.6 |
| | Surface Roughness SRa | Layer A Side | nm | | | |
| | | Layer B Side | nm | 26 | 26 | 26 |
| | Strength at break | Direction X (Fx) | MPa | 123 | 145 | 160 |
| | | Direction Y (Fy) | MPa | 117 | 140 | 166 |
| | | \|Fx − Fy\| | MPa | 6 | 5 | 6 |
| | Elongation at break | Direction X (Lx) | % | 187 | 130 | 165 |
| | | Direction Y (Ly) | % | 194 | 124 | 160 |
| | | \|Lx − Ly\| | % | 7 | 6 | 5 |
| | L Value | | — | 84 | 85 | 83 |
| | Glossiness | | % | 98 | 98 | 98 |
| | Ten-minute Thermal Treatment at 120° C. Glossiness | Glossiness After Treatment | % | 86 | 80 | 86 |
| | | Rate of Change Before and After Treatment | % | 12.2 | 18.4 | 12.2 |
| | 50% Stretching Glossiness | Glossiness After Stretching | % | 85 | 80 | 85 |
| | | Rate of Change Before and After Stretching | % | 13.3 | 18.4 | 13.3 |
| | Processability Evaluation | | — | C | A | A |
| | Covering Property Evaluation | | — | A | A | B |
| | Molding Property Evaluation | | — | A | B | A |
| | Glossy Appearance Evaluation | | — | A | B | A |

TABLE 8

|  |  |  |  |  | Reference Example 13 | Reference Example 14 | Reference Example 15 |
|---|---|---|---|---|---|---|---|
| Film Structure | Polyester Layer A | Resin | — | | Polyester C (51% by mass) White Pigment Master G (46% by mass) Particle Master H (3% by mass) | Polyester C (51% by mass) White Pigment Master F (46% by mass) Particle Master H (3% by mass) | Polyester C (53% by mass) White Pigment Master F (46% by mass) Particle Master I (1% by mass) |
| | | Composition | Glycol | | EG (100 mol %) | EG (100 mol %) | EG (100 mol %) |
| | | | Dicarboxylic Acid | | TPA (100 mol %) | TPA (100 mol %) | TPA (100 mol %) |
| | | Melting Point | ° C. | | 255 | 255 | 255 |
| | | Thickness of Single Layer | μm | | 16 | 16 | 16 |
| | | White Pigment | Type | | Rutile Titanium Oxide | Anatase Titanium Oxide | Anatase Titanium Oxide |
| | | | % by mass | | 23 | 23 | 23 |
| | Polyester Layer B | Resin | — | | Polyester C (97% by mass) Particle Master H (3% by mass) | Polyester C (97% by mass) Particle Master H (3% by mass) | Polyester C (99% by mass) Particle Master I (1% by mass) |
| | | Composition | Glycol | | EG (100 mol %) | EG (100 mol %) | EG (100 mol %) |
| | | | Dicarboxylic Acid | | TPA (100 mol %) | TPA (100 mol %) | TPA (100 mol %) |

TABLE 8-continued

|  |  |  |  |  |  |  |
|---|---|---|---|---|---|---|
|  |  | Melting Point | ° C. | 255 | 255 | 255 |
|  |  | Thickness of Single Layer | μm | 2 | 2 | 2 |
|  |  | White Pigment | Type |  |  |  |
|  |  |  | % by mass | 0 | 0 | 0 |
|  | Structure |  | — | B/A/B | B/A/B | B/A/B |
|  | Layer Number |  | Layer | 3 | 3 | 3 |
|  | Film Thickness |  | μm | 20 | 20 | 20 |
|  | Film Melting Point |  | ° C. | 255 | 255 | 255 |
| Production Conditions | Vertical Stretching Ratio |  | Times | 3 | 3.5 | 3 |
|  | Horizontal Stretching Ratio |  | Times | 3.5 | 3 | 15 |
|  | Thermal Treatment Temperature |  | ° C. | 210 | 198 | 210 |
| Film Properties | Thermal Shrinkage Ratio at 190° C. in 20 min | Direction X (Sx) | % | 3 | 4.8 | 3.1 |
|  |  | Direction Y (Sy) | % | 2.5 | 3.3 | 2.6 |
|  |  | \|Sx − Sy\| | % | 0.5 | 1.5 | 0.5 |
|  | Surface Roughness SRa | Layer A Side | nm | — | — | — |
|  |  | Layer B Side | nm | 26 | 26 | 7 |
|  | Strength at break | Direction X (Fx) | MPa | 145 | 154 | 156 |
|  |  | Direction Y (Fy) | MPa | 156 | 140 | 167 |
|  |  | \|Fx − Fy\| | MPa | 11 | 14 | 11 |
|  | Elongation at break | Direction X (Lx) | % | 145 | 153 | 160 |
|  |  | Direction Y (Ly) | % | 140 | 181 | 155 |
|  |  | \|Lx − Ly\| | % | 5 | 28 | 5 |
|  | L Value |  | — | 86 | 84 | 84 |
|  | Glossiness |  | % | 98 | 96 | 103 |
|  | Ten-minute Thermal Treatment at 120° C. Glossiness | Glossiness After Treatment | % | 83 | 82 | 87 |
|  |  | Rate of Change Before and After Treatment | % | 15.3 | 14.6 | 15.5 |
|  | 50% Stretching Glossiness | Glossiness After Stretching | % | 82 | 81 | 95 |
|  |  | Rate of Change Before and After Stretching | % | 16.3 | 15.6 | 7.8 |
|  | Processability Evaluation |  | — | A | C | A |
|  | Covering Property Evaluation |  | — | A | A | A |
|  | Molding Property Evaluation |  | — | C | B | C |
|  | Glossy Appearance Evaluation |  | — | A | A | A |

|  |  |  |  | Reference Example 16 | Reference Example 17 | Reference Comparison Example 1 |
|---|---|---|---|---|---|---|
| Film Structure | Polyester Layer A | Resin | — | Polyester C (75% by mass) White Pigment Master F (22% by mass) Particle Master H (3% by mass) | Polyester E (51% by mass) White Pigment Master F (46% by mass) Particle Master H (3% by mass) | Polyester C (69% by mass) White Pigment Master F (28% by mass) Particle Master H (3% by mass) |
|  |  | Composition | Glycol | EG (100 mol %) | EG (100 mol %) | EG (100 mol %) |
|  |  |  | Dicarboxylic Acid | TPA (100 mol %) | TPA (90 mol %) IPA (10 mol %) | TPA (100 mol %) |
|  |  | Melting Point | ° C. | 255 | 235 | 255 |
|  |  | Thickness of Single Layer | μm | 32 | 16 | 16 |
|  |  | White Pigment | Type | Anatase Titanium Oxide | Anatase Titanium Oxide | Anatase Titanium Oxide |
|  |  |  | % by mass | 11 | 23 | 14 |
|  | Polyester Layer B | Resin | — | Polyester C (97% by mass) Particle Master H (3% by mass) | Polyester C (97% by mass) Particle Master H (3% by mass) | Polyester C (97% by mass) Particle Master H (3% by mass) |
|  |  | Composition | Glycol | EG (100 mol %) | EG (100 mol %) | EG (100 mol %) |
|  |  |  | Dicarboxylic Acid | TPA (100 mol %) | TPA (100 mol %) | TPA (100 mol %) |
|  |  | Melting Point | ° C. | 255 | 255 | 255 |
|  |  | Thickness of Single Layer | μm | 4 | 2 | 2 |
|  |  | White Pigment | Type | — | — | — |
|  |  |  | % by mass | 0 | 0 | 0 |
|  | Structure |  | — | B/A/B | B/A/B | B/A/B |
|  | Layer Number |  | Layer | 3 | 3 | 3 |
|  | Film Thickness |  | μm | 40 | 20 | 20 |
|  | Film Melting Point |  | ° C. | 255 | 235 | 255 |
| Production Conditions | Vertical Stretching Ratio |  | Times | 3.9 | 2.9 | 3 |
|  | Horizontal Stretching Ratio |  | Times | 3.9 | 3 | 3.5 |
|  | Thermal Treatment Temperature |  | ° C. | 198 | 198 | 210 |

TABLE 8-continued

| | | | | | | |
|---|---|---|---|---|---|---|
| Film Properties | Thermal Shrinkage Ratio at 190° C. in 20 min | Direction X (Sx) | % | 4.7 | 4.8 | 3 |
| | | Direction Y (Sy) | % | 3.5 | 4.4 | 2.4 |
| | | |Sx − Sy| | % | 1.2 | 0.4 | 0.6 |
| | Surface Roughness SRa | Layer A Side | nm | | | |
| | | Layer B Side | nm | 31 | 25 | 26 |
| | Strength at break | Direction X (Fx) | MPa | 198 | 123 | 163 |
| | | Direction Y (Fy) | MPa | 195 | 117 | 169 |
| | | |Fx − Fy| | MPa | 3 | 6 | 6 |
| | Elongation at break | Direction X (Lx) | % | 145 | 198 | 170 |
| | | Direction Y (Ly) | % | 149 | 198 | 166 |
| | | |Lx − Ly| | % | 4 | 0 | 4 |
| | L Value | | — | 80 | 84 | 78 |
| | Glossiness | | % | 95 | 98 | 98 |
| | Ten-minute Thermal Treatment at 120° C. Glossiness | Glossiness After Treatment | % | 82 | 86 | 83 |
| | | Rate of Change Before and After Treatment | % | 13.7 | 12.2 | 15.3 |
| | 50% Stretching Glossiness | Glossiness After Stretching | % | 78 | 85 | 82 |
| | | Rate of Change Before and After Stretching | % | 17.9 | 13.3 | 16.3 |
| | Processability Evaluation | | — | C | C | A |
| | Covering Property Evaluation | | — | C | A | D |
| | Molding Property Evaluation | | — | A | A | A |
| | Glossy Appearance Evaluation | | — | A | A | A |

TABLE 9

| | | | | Reference Comparison Example 2 | Reference Comparison Example 3 | Reference Comparison Example 4 |
|---|---|---|---|---|---|---|
| Film Structure | Polyester Layer A | Resin | — | Polyester C (51% by mass) White Pigment Master F (46% by mass) Particle Master H (3% by mass) | Polyester E (61% by mass) White Pigment Master F (36% by mass) Particle Master H (3% by mass) | Polyester C (47% by mass) White Pigment Master F (50% by mass) Particle Master H (3% by mass) |
| | | Composition | Glycol | EG (100 mol %) | EG (100 mol %) | EG (100 mol %) |
| | | | Dicarboxylic Acid | TPA (100 mol %) | TPA (90 mol %) IPA (10 mol %) | TPA (100 mol %) IPA (10 |
| | | Melting Point | ° C. | 255 | 235 | 255 |
| | | Thickness of Single Layer | μm | 9.6 | 16 | 9.6 |
| | | White Pigment | Type | Anatase Titanium Oxide | Anatase Titanium Oxide | Anatase Titanium Oxide |
| | | | % by mass | 23 | 24 | 25 |
| | Polyester Layer B | Resin | — | Polyester C (97% by mass) Particle Master H (3% by mass) | Polyester E (97% by mass) Particle Master H (3% by mass) | — |
| | | Composition | Glycol | EG (100 mol %) | EG (100 mol %) | — |
| | | | Dicarboxylic Acid | TPA (100 mol %) | TPA (100 mol %) | — |
| | | Melting Point | ° C. | 255 | 255 | — |
| | | Thickness of Single Layer | μm | 0.2 | 2 | — |
| | | White Pigment | Type | — | — | — |
| | | | % by mass | 0 | 0 | — |
| | Structure | | — | B/A/B | B/A/B | A |
| | Layer Number | | Layer | 3 | 3 | 1 |
| | Film Thickness | | μm | 20 | 20 | 9.6 |
| | Film Melting Point | | ° C. | 255 | 235 | 255 |
| Production Conditions | Vertical Stretching Ratio | | Times | 2.8 | 3 | 3 |
| | Horizontal Stretching Ratio | | Times | 2.8 | 3.5 | 3.5 |
| | Thermal Treatment Temperature | | ° C. | 193 | 195 | 210 |
| Film Properties | Thermal Shrinkage Ratio at 190° C. in 20 min | Direction X (Sx) | % | 5.6 | 5.1 | 4.7 |
| | | Direction Y (Sy) | % | 6.7 | 4.7 | 4.2 |
| | | |Sx − Sy| | % | 1.1 | 0.4 | 0.5 |
| | Surface Roughness SRa | Layer A Side | nm | — | — | 37 |
| | | Layer B Side | nm | 26 | 26 | — |
| | Strength at break | Direction X (Fx) | MPa | 106 | 120 | 125 |

TABLE 9-continued

| | | | | | | |
|---|---|---|---|---|---|---|
| | | Direction Y (Fy) | MPa | 109 | 115 | 122 |
| | | \|Fx − Fy\| | MPa | 3 | 5 | 3 |
| | Elongation at break | Direction X (Lx) | % | 65 | 190 | 70 |
| | | Direction Y (Ly) | % | 50 | 198 | 65 |
| | | \|Lx − Ly\| | % | 15 | 8 | 5 |
| | L Value | | — | 72 | 84 | 79 |
| | Glossiness | | % | 98 | 98 | 78 |
| | Ten-Minute Thermal Treatment at 120° C. | Glossiness After Treatment | % | 83 | 84 | 68 |
| | Glossiness | Rate of Change Before and After Treatment | % | 15.3 | 14.3 | 12.8 |
| | 50% Stretching Glossiness | Glossiness After Stretching | % | 82 | 86 | 58 |
| | | Rate of Change Before and After Stretching | % | 16.3 | 12.2 | 25.6 |
| | Processability Evaluation | | — | D | D | D |
| | Covering Property Evaluation | | — | D | A | D |
| | Molding Property Evaluation | | — | D | A | C |
| | Glossy Appearance Evaluation | | — | A | A | D |

| | | | | Reference Comparison Example 5 | Reference Comparison Example 6 | Reference Comparison Example 7 |
|---|---|---|---|---|---|---|
| Film Structure | Polyester Layer A | Resin | — | Polyester C (51% by mass) White Pigment Master F (46% by mass) Particle Master H (3% by mass) | Polyester C (61% by mass) White Pigment Master F (36% by mass) Particle Master H (3% by mass) | Polyester E (61% by mass) White Pigment Master F (36% by mass) Particle Master H (3% by mass) |
| | | Composition | Glycol | EG (100 mol %) | EG (100 mol %) | EG (100 mol %) |
| | | | Dicarboxylic Acid | TPA (100 mol %) mol%) | TPA (100 mol %) | TPA (90 mol %) |
| | | Melting Point | ° C. | 255 | 255 | 235 |
| | | Thickness of Single Layer | μm | 16 | 41 | 16 |
| | | White Pigment | Type | Anatase Titanium Oxide | Anatase Titanium Oxide | Anatase Titanium Oxide |
| | | | % by mass | 23 | 18 | 18 |
| | Polyester Layer B | Resin | — | Polyester C (97% by mass) Particle Master H (3% by mass) | — | Polyester E (97% by mass) Particle Master H (3% by mass) |
| | | Composition | Glycol | EG (100 mol %) | — | EG (100 mol %) |
| | | | Dicarboxylic Acid | TPA (100 mol %) | — | TPA (100 mol %) |
| | | Melting Point | ° C. | 255 | — | 235 |
| | | Thickness of Single Layer | μm | 2 | — | 2 |
| | | White Pigment | Type | — | — | — |
| | | | % by mass | 0 | — | 0 |
| | Structure | | — | B/A/B | A | B/A/B |
| | Layer Number | | Layer | 3 | 1 | 3 |
| | Film Thickness | | μm | 20 | 41 | 20 |
| | Film Melting Point | | ° C. | 255 | 255 | 235 |
| Production Conditions | Vertical Stretching Ratio | | Times | 4 | 3 | 3.8 |
| | Horizontal Stretching Ratio | | Times | 3 | 3.5 | 3.3 |
| | Thermal Treatment Temperature | | ° C. | 195 | 210 | 195 |
| Film Properties | Thermal Shrinkage Ratio at 190° C. in 20 min | Direction X (Sx) | % | 7.4 | 3.4 | 4.8 |
| | | Direction Y (Sy) | % | 3.3 | 2.7 | 5.2 |
| | | \|Sx − Sy\| | % | 4.1 | 0.7 | 0.4 |
| | Surface Roughness SRa | Layer A Side | nm | — | 32 | — |
| | | Layer B Side | nm | 26 | — | 26 |
| | Strength at break | Direction X (Fx) | MPa | 152 | 141 | 130 |
| | | Direction Y (Fy) | MPa | 138 | 145 | 115 |
| | | \|Fx − Fy\| | MPa | 14 | 4 | 15 |
| | Elongation at break | Direction X (Lx) | % | 148 | 82 | 180 |
| | | Direction Y (Ly) | % | 178 | 75 | 190 |
| | | \|Lx − Ly\| | % | 30 | 7 | 10 |

TABLE 9-continued

| | | | | | |
|---|---|---|---|---|---|
| L Value | | — | 84 | 86 | 84 |
| Glossiness | | % | 95 | 83 | 97 |
| Ten-Minute Thermal Treatment at 120° C. | Glossiness After Treatment | % | 82 | 68 | 83 |
| Glossiness | Rate of Change Before and After Treatment | % | 13.7 | 18.1 | 14.4 |
| 50% Stretching Glossiness | Glossiness After Stretching | % | 81 | 68 | 86 |
| | Rate of Change Before and After Stretching | % | 14.7 | 18.1 | 11.3 |
| Processability Evaluation | | — | D | A | D |
| Covering Property Evaluation | | — | A | A | A |
| Molding Property Evaluation | | — | B | D | A |
| Glossy Appearance Evaluation | | — | A | C | A |

Reference Example 51

Raw materials were supplied in the composition as in Table 11-1 and at an oxygen concentration of 0.2% by volume into a same-direction, vent-type twin screw extruder and mixed to form a mixture in the composition as described in the Layer A row of Table 10. The mixture was dried in vacuum at 150° C. for 3 hours, and supplied into a single screw extruder (layer A). A mixture in the composition as described in the Layer B row of Table 10-1 was further formed, dried and supplied into a different single screw extruder (layer B). These polymers were melted at 280° C. in separate flow paths and laminated in the feed block into a structure of the layer A/layer B/layer A (lamination ratio 1/10/1), and discharged via a T-die in the shape of a sheet onto a cooling drum which was temperature-controlled at 15° C. In doing so, static electricity was applied using wire-shaped electrodes having a diameter of 0.1 mm to attach the resulting film closely to the cooling drum, and an unstretched sheet was thus obtained. Then, preheating was carried out in the longitudinal direction for 1.5 seconds at a preheating temperature of 100° C. The sheet was stretched in the longitudinal direction by 3.1 times at the stretching temperature of 101° C., and then immediately cooled with a metal roll with the temperature controlled at 40° C. Using a tenter-type transverse stretching machine, preheating was then carried out for 1.5 seconds at the preheating temperature of 110° C. The sheet was stretched by 3.6 times in the transverse direction at the stretching temperature of 115° C., and then directly heat-treated at 100° C. by a roll-heating method. Afterwards, in the tenter, the sheet was thermally treated for 3 seconds at the thermal treatment temperature of 200° C. and for 4 seconds at 220° C. while applying the relaxation of 7% in the transverse direction to obtain a laminated film.

Reference Examples 52 to 56

A laminated film was obtained in the same way as in Reference Example 51 except that the composition was changed as shown in Table 11-1.

Reference Example 57

A laminated film was obtained in the same way as in Reference Example 51 except that the composition was changed as shown in Table 11-1 and the structure was a two-layer A/B structure. For the evaluation of the coverage property, molding property, and print property, a steel sheet was laminated on the layer B side.

Reference Example 58

A laminated film was obtained in the same way as in Reference Example 51 except that the composition was changed as shown in Table 11-1, and the thermal treatment temperature was changed to 236° C.

Reference Example 59

A laminated film was obtained in the same way as in Reference Example 58 except that the sheet was stretched by 2.5 times in the longitudinal direction and by 3 times in the transverse direction.

Reference Examples 60 to 61

A laminated film was obtained in the same way as in Reference Example 51 except that the composition was changed as shown in Tables 11-1 and 11-2, the sheet was stretched by 3.7 times in the longitudinal direction and by 4.3 times in the transverse direction, and the thermal treatment temperature was changed to 210° C.

Example 62

A laminated film was obtained in the same way as in Reference Example 51 except that the composition was changed as shown in Table 11-2, and the thermal treatment temperature was changed to 210° C.

Reference Comparison Examples 51 to 54

A laminated film was obtained in the same way as in Reference Example 51 except that the composition was changed as shown in Table 11-2.

Reference Comparison Example 55

A laminated film was obtained in the same way as in Reference Example 51 except that the composition was changed as shown in Table 11-2, and the thermal treatment temperature was changed to 236° C.

Reference Comparison Examples 56 and 57

A laminated film was obtained in the same way as in Reference Example 51 except that the composition was changed as shown in Table 11-2, and the thermal treatment temperature was changed to 180° C.

TABLE 10-1

| | | Reference Example 51 | Reference Example 52 | Reference Example 53 | Reference Example 54 | Reference Example 55 | Reference Example 56 | Reference Example 57 | Reference Example 58 | Reference Example 59 | Reference Example 60 |
|---|---|---|---|---|---|---|---|---|---|---|---|
| Structure | Laminate Structure | A/B/A | A/B/A | A/B/A | A/B/A | A/B/A | A/B/A | NB | A/B/A | A/B/A | A/B/A |
| Layer A | Presence or Absence of Wax Component | ○ | ○ | ○ | ○ | ○ | ○ | ○ | ○ | ○ | ○ |
| | Particle Type | Silica Particles | Silica Particles | Silica Particles | Silica Particles | Silica Particles | Silica Particles | Silica Particles | Silica Particles | Silica Particles | Silica Particles |
| | Mohs Hardness of Particles | 7 | 7 | 7 | 7 | 7 | 7 | 7 | 7 | 7 | 7 |
| Layer B | Ratio of Cumulative Thickness of Voids in Laminate Thickness Direction to Total Film Thickness (%) | 6.0 | 12.0 | 19.0 | 12.0 | 16.5 | 12.0 | 16.5 | 8.0 | 7.0 | 17.0 |
| | Ratio of Cumulative Length of Voids in Surface Direction to 30 μm in Surface Direction (%) | 2.5 | 6.0 | 9.5 | 6.0 | 8.0 | 6.0 | 9.0 | 4.5 | 4.0 | 9.0 |
| | Ratio of Void Content to All Film Layers (%) | 2.5 | 5.0 | 7.5 | 5.0 | 6.8 | 5.0 | 7.6 | 3.2 | 3.2 | 7.0 |
| | White Pigment Content (wt %) | 20.0 | 22.0 | 35.0 | 22.0 | 30.0 | 22.0 | 28.0 | 18.0 | 18.0 | 22.0 |
| | White Pigment Average Particle Size (μm) | 0.2 | 0.4 | 2.0 | 0.4 | 0.4 | 0.4 | 0.4 | 0.4 | 0.4 | 0.4 |
| Properties | Whiteness | 86 | 90 | 98 | 90 | 102 | 90 | 99 | 83 | 82 | 93 |
| | Coefficient of Static Friction μs | 0.18 | 0.18 | 0.18 | 0.24 | 0.18 | 0.18 | 0.18 | 0.18 | 0.18 | 0.18 |
| | Thermal Shrinkage in Longitudinal Direction at 190° C. after 20 min (%) | 3 | 3 | 3 | 3 | 3 | 3 | 3 | 2 | 2 | 5 |
| | Surface Roughness SRa (nm) | 20 | 20 | 20 | 20 | 20 | 35 | 20 | 20 | 20 | 20 |
| | Surface Free Energy (mN/m) | 32 | 32 | 32 | 34 | 31 | 31 | 32 | 32 | 32 | 32 |
| Evaluation | Molding Property | ○ | ◎ | ○ | ○ | ○ | ◎ | ○ | ◎ | ◎ | ○ |
| | Covering Property | ◎ | ◎ | ◎ | ◎ | ◎ | ◎ | ◎ | ○ | ○ | ◎ |
| | Print Processability | ◎ | ◎ | ◎ | ◎ | ◎ | ◎ | ◎ | ◎ | ◎ | ○ |
| | Print Property (Aesthetic Property) | ◎ | ◎ | ◎ | ◎ | ○ | ○ | ◎ | ◎ | ◎ | ◎ |
| | Releasability | ◎ | ◎ | ◎ | ◎ | ◎ | ◎ | ◎ | ◎ | ◎ | ◎ |

TABLE 10-2

|  |  | Reference Example 61 | Reference Example 62 | Reference Comparison Example 51 | Reference Comparison Example 52 | Reference Comparison Example 53 | Reference Comparison Example 54 | Reference Comparison Example 55 | Reference Comparison Example 56 | Reference Comparison Example 57 |
| --- | --- | --- | --- | --- | --- | --- | --- | --- | --- | --- |
| Structure | Laminate Structure | A/B/A | A/B/A | A/B/A | A/B/A | A/B/A | A/B/A | A/B/A | A/B/A | A/B/A |
| Layer A | Presence or Absence of Wax Component | ○ | ○ | × | ○ | ○ | ○ | × | ○ | ○ |
|  | Particle Type | Organic Particles | Silica Particles | Silica Particles | Silica Particles | Silica Particles | Silica Particles | Silica Particles | Silica Particles | Silica Particles |
|  | Mohs Hardness of Particles | 3 | 7 | 7 | 7 | 7 | 7 | 7 | 7 | 7 |
| Layer B | Ratio of Cumulative Thickness of Voids in Laminate Thickness Direction to Total Film Thickness (%) | 17.0 | 13.0 | 12.0 | 1.5 | 28.0 | 1.5 | 1.5 | 21.0 | 2.0 |
|  | Ratio of Cumulative Length of Voids in Surface Direction to 30 μm in Surface Direction (%) | 9.0 | 6.5 | 6.0 | 0.8 | 14.0 | 0.8 | 0.8 | 11.0 | 0.8 |
|  | Ratio of Void Content to All Film Layers (%) | 7.0 | 5.4 | 5.0 | 0.6 | 7.5 | 0.6 | 0.6 | 10.0 | 0.8 |
|  | White Pigment Content (wt %) | 22.0 | 18.0 | 22.0 | 22.0 | 35.0 | 28.0 | 18.0 | 22.0 | 22.0 |
|  | White Pigment Average Particle Size (μm) | 0.4 | 0.4 | 0.4 | 0.05 | 3.0 | 0.05 | 0.05 | 0.4 | 0.4 |
| Properties | Whiteness | 93 | 85 | 90 | 79 | 105 | 95 | 79 | 95 | 88 |
|  | Coefficient of Static Friction μs | 0.18 | 0.18 | 0.26 | 0.26 | 0.18 | 0.26 | 0.13 | 0.18 | 0.18 |
|  | Thermal Shrinkage in Longitudinal Direction at 190° C. after 20 min (%) | 5 | 4 | 3 | 3 | 3 | 3 | 2 | 11 | 18 |
|  | Surface Roughness SRa (nm) | 20 | 20 | 20 | 20 | 20 | 20 | 60 | 20 | 20 |
|  | Surface Free Energy (mN/m) | 32 | 32 | 32 | 38 | 32 | 28 | 45 | 32 | 34 |
| Evaluation | Molding Property | ◎ | ◎ | Δ | Δ | × | Δ | × | Δ | ○ |
|  | Covering Property | ◎ | ○ | ◎ | ◎ | ◎ | ◎ | × | ◎ | ◎ |
|  | Print Processability | ○ | ○ | ◎ | ◎ | ◎ | ◎ | ◎ | × | × |
|  | Print Property (Aesthetic Property) | ◎ | ◎ | ◎ | ◎ | ◎ | × | × | ◎ | ◎ |
|  | Releasability | ◎ | ◎ | × | × | ◎ | ◎ | × | ◎ | ◎ |

TABLE 11-1

|  |  | Reference Example 51 | Reference Example 52 | Reference Example 53 | Reference Example 54 | Reference Example 55 | Reference Example 56 | Reference Example 57 | Reference Example 58 | Reference Example 59 | Reference Example 60 |
| --- | --- | --- | --- | --- | --- | --- | --- | --- | --- | --- | --- |
| Layer A | Ratio of Polyester J (wt %) | 17 | 17 | 17 | 57 | 7 | 2 | 17 | 17 | 17 | 17 |
|  | Ratio of Polyester K (wt %) | — | — | — | — | — | — | — | — | — | — |
|  | Ratio of Wax Master Polyester L (wt %) | 80 | 80 | 80 | 40 | 90 | 90 | 80 | 80 | 80 | 80 |
|  | Ratio of Particle Master R (wt %) | 3 | 3 | 3 | 3 | 3 | 8 | 3 | 3 | 3 | 3 |
|  | Ratio of Particle Master S (wt %) | — | — | — | — | — | — | — | — | — | — |
| Layer B | Ratio of Polyester J (wt %) | 60 | 56 | 30 | 56 | 40 | 56 | 44 | 64 | 64 | 56 |
|  | Ratio of Polyester K (wt %) | — | — | — | — | — | — | — | — | — | — |
|  | Ratio of White Pigment Master M (wt %) | 40 | — | — | — | — | — | — | — | — | — |
|  | Ratio of White Pigment Master N (wt %) | — | 44 | — | 44 | 60 | 44 | 56 | 36 | 36 | 44 |

TABLE 11-1-continued

|  | Reference Example 51 | Reference Example 52 | Reference Example 53 | Reference Example 54 | Reference Example 55 | Reference Example 56 | Reference Example 57 | Reference Example 58 | Reference Example 59 | Reference Example 60 |
|---|---|---|---|---|---|---|---|---|---|---|
| Ratio of White Pigment Master O (wt %) | — | — | 70 | — | — | — | — | — | — | — |
| Ratio of White Pigment Master P (wt %) | — | — | — | — | — | — | — | — | — | — |
| Ratio of White Pigment Master Q (wt %) | — | — | — | — | — | — | — | — | — | — |

TABLE 11-2

| | | Reference Example 61 | Reference Example 62 | Reference Comparison Example 51 | Reference Comparison Example 52 | Reference Comparison Example 53 | Reference Comparison Example 54 | Reference Comparison Example 55 | Reference Comparison Example 56 | Reference Comparison Example 57 |
|---|---|---|---|---|---|---|---|---|---|---|
| Layer A | Ratio of Polyester J (wt %) | 17 | 17 | 97 | 77 | 17 | — | 80 | 17 | — |
| | Ratio of Polyester K (wt %) | — | — | — | — | — | — | — | — | 57 |
| | Ratio of Wax Master Polyester L (wt %) | 80 | 80 | — | 20 | 80 | 97 | — | 80 | 40 |
| | Ratio of Particle Master R (wt %) | — | 3 | 3 | 3 | 3 | 3 | 20 | 3 | 3 |
| | Ratio of Particle Master S (wt %) | 3 | — | — | — | — | — | — | — | — |
| Layer B | Ratio of Polyester J (wt %) | 56 | 64 | 56 | 56 | 30 | 44 | 64 | 56 | — |
| | Ratio of Polyester K (wt %) | — | — | — | — | — | — | — | — | 56 |
| | Ratio of White Pigment Master M (wt %) | — | — | — | — | — | — | — | — | — |
| | Ratio of White Pigment Master N (wt %) | 44 | 36 | 44 | — | — | — | — | 44 | 44 |
| | Ratio of White Pigment Master O (wt %) | — | — | — | — | — | — | — | — | — |
| | Ratio of White Pigment Master P (wt %) | — | — | — | 44 | — | 56 | 36 | — | — |
| | Ratio of White Pigment Master Q (wt %) | — | — | — | — | 70 | — | — | — | — |

INDUSTRIAL APPLICABILITY

We provide a polyester film suitably used for applications that require coverage property such as a laminated metal sheet or a light-blocking tape. When attached with a metal sheet to form a laminated metal sheet, the sheet exhibits good base coverage property and good scratch resistance during deep-drawing molding. When used as a light-blocking tape, it exhibits a good yield and good processing suitability. Thus, our films are used preferably for the application that requires coverage property such as a laminated metal sheet or a light-blocking tape.

The invention claimed is:

1. A laminated polyester film comprising: a polyester layer A containing pigment; and polyester layers B1 and B2, each of layers B1 and B2 containing wax, on both sides of the polyester layer A, wherein the film satisfies formulae (I), (II) and III, a surface free energy of each layer B1 and layer B2 is not less than 27 mN/m and not more than 43 mN/mm, and a coefficient of variation of water contact angle for each layer B1 and layer B2 is not less than 0% and not more than 10%, when a contact angle with water is measured 10 times at arbitrary defined positions within 200 mm×200 mm:

$$Wb1 > Wa \quad (I)$$

$$Wb2 > Wa \quad (II)$$

$$Wb1 > Wb2 \quad (III)$$

wherein Wb1 and Wb2 represent wax content per unit area ($\mu g/cm^2$) of the layer B1 and layer B2 respectively, Wa represents wax content per unit area ($\mu g/cm^2$) of the layer A,), Wb1 is not less than 6 $\mu g/cm^2$ and not more than 20 $\mu g/cm^2$, Wb2 is not less than 4 $\mu g/cm^2$ and not more than 10 $\mu g/cm^2$, and the coefficient of variation of water contact value represents a value obtained by dividing the standard deviation in values measured 10 times by the average value.

2. The laminated polyester film according to claim 1, wherein the melting point of each of the polyester layer A, the polyester layer B1 and the polyester layer B2 is higher than 250° C. and equal to or lower than 280° C.

3. The laminated polyester film according to claim 1, wherein both the polyester layers B1 and B2 contain a pigment in an amount of not less than 0% by mass and not more than 5% by mass.

4. The laminated polyester film according to claim 1, having a color tone L value in the Hunter color system of 65 or more.

5. The laminated polyester film according to claim 1, having a thickness of not less than 10 μm and not more than 40 μm.

6. The laminated polyester film according to claim 1, wherein the film satisfies formulae (IV) to (VI) in which t (μm) represents the total thickness of the film, ta (μm)

represents the thickness of the polyester layer A, tb1 (μm) represents the thickness of the polyester layer B1, and tb2 (μm) represents the thickness of the polyester layer B2:

$$tb1/tb2 > 1 \tag{IV}$$

$$0.05 \ \mu m \leq |tb1 - tb2| \leq 2 \ \mu m \tag{V}$$

$$0.08 \leq (tb1 + tb2)/t \leq 0.3 \tag{VI}.$$

7. A laminated metal sheet comprising the film according to claim 1, wherein the polyester layer B2 is laminated on the metal sheet.

8. A light-blocking tape formed from the laminated polyester film according to claim 1.

* * * * *